March 21, 1939.  H. L. ALEXANDER ET AL  2,151,578
METHOD OF AND APPARATUS FOR ISOLATING MINERALS
Filed Feb. 7, 1939   16 Sheets-Sheet 1
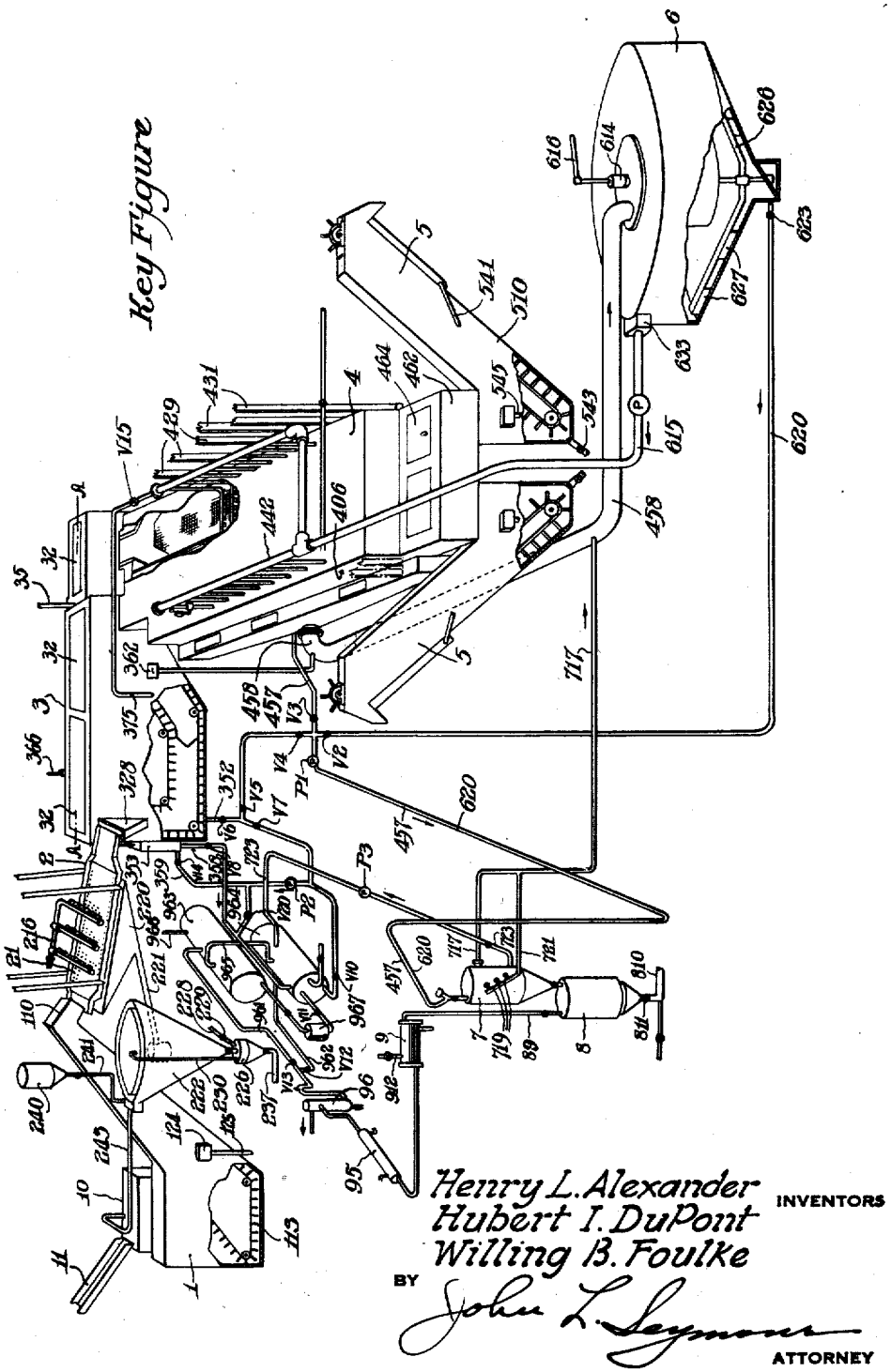
INVENTORS
Henry L. Alexander
Hubert I. DuPont
Willing B. Foulke
BY
ATTORNEY

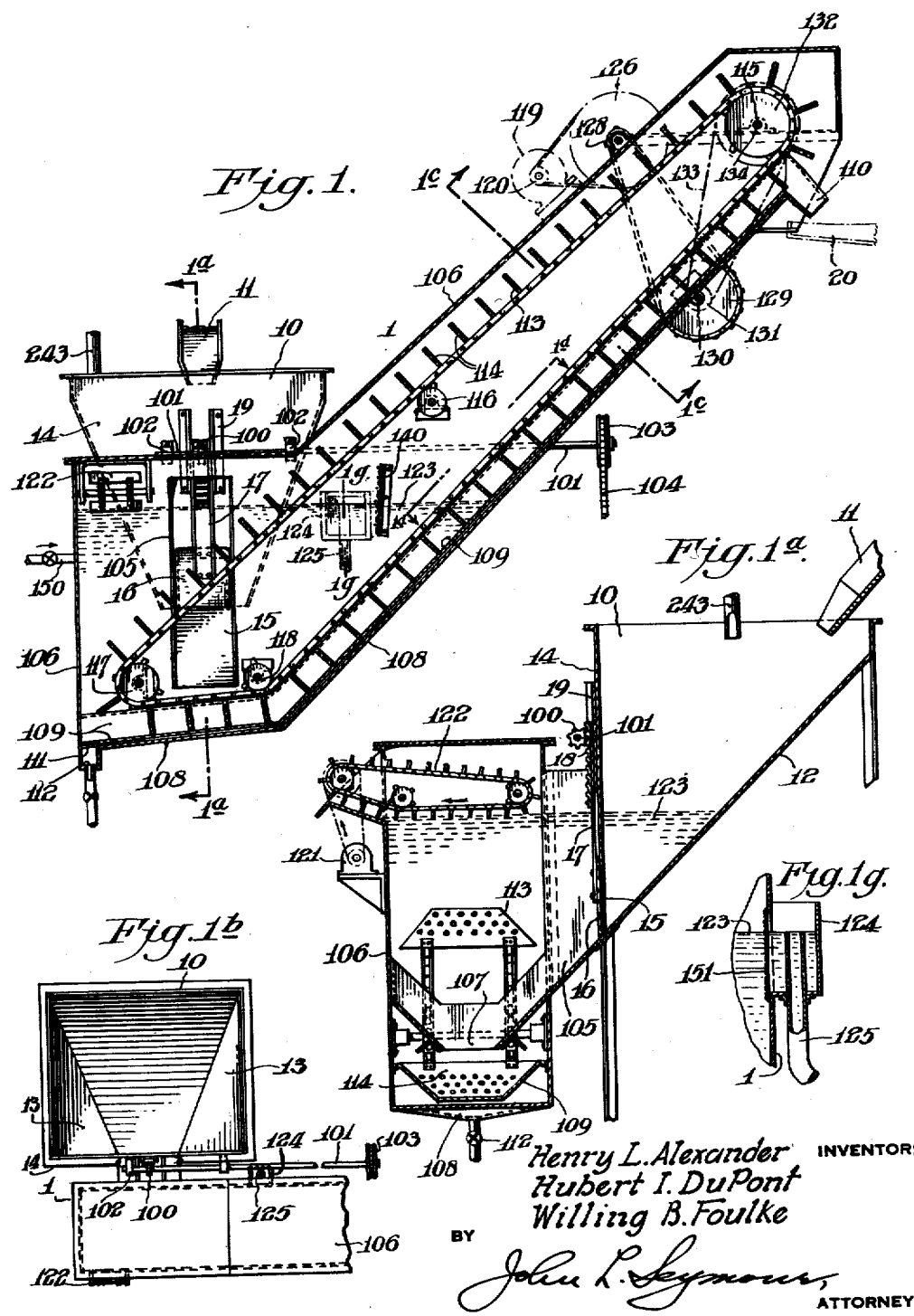

March 21, 1939. H. L. ALEXANDER ET AL 2,151,578
METHOD OF AND APPARATUS FOR ISOLATING MINERALS
Filed Feb. 7, 1939 16 Sheets-Sheet 3
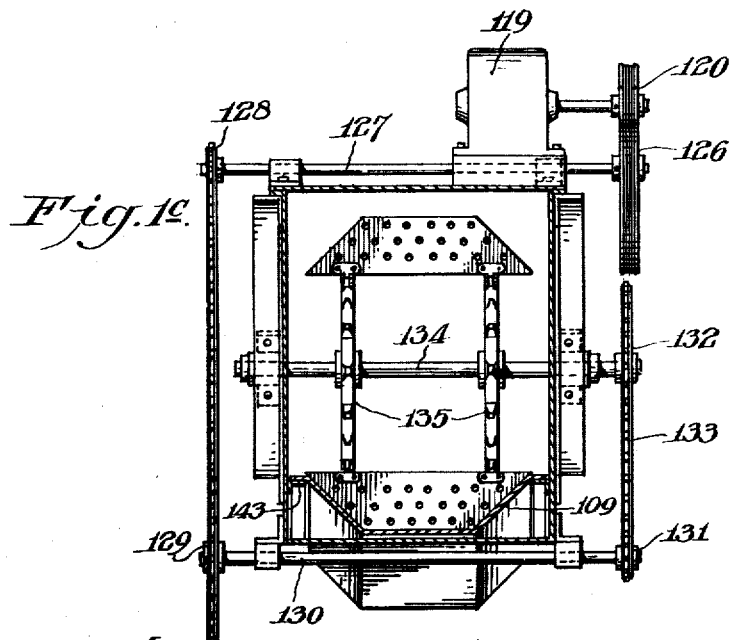
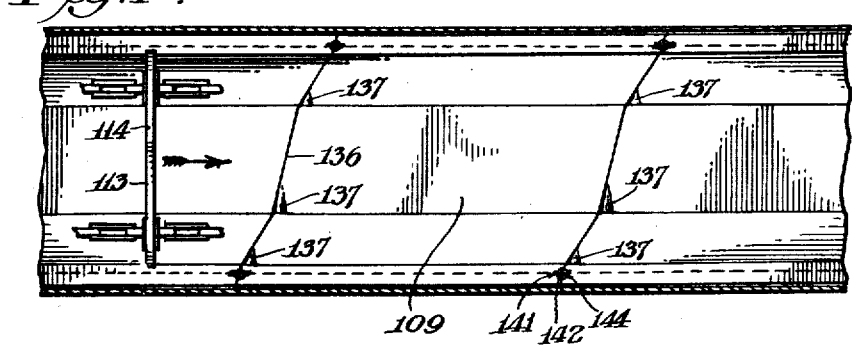
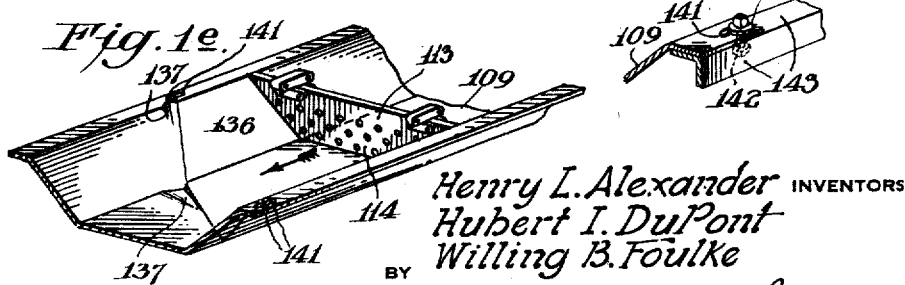
Henry L. Alexander INVENTORS
Hubert I. DuPont
Willing B. Foulke
BY
John L. Seymour
ATTORNEY

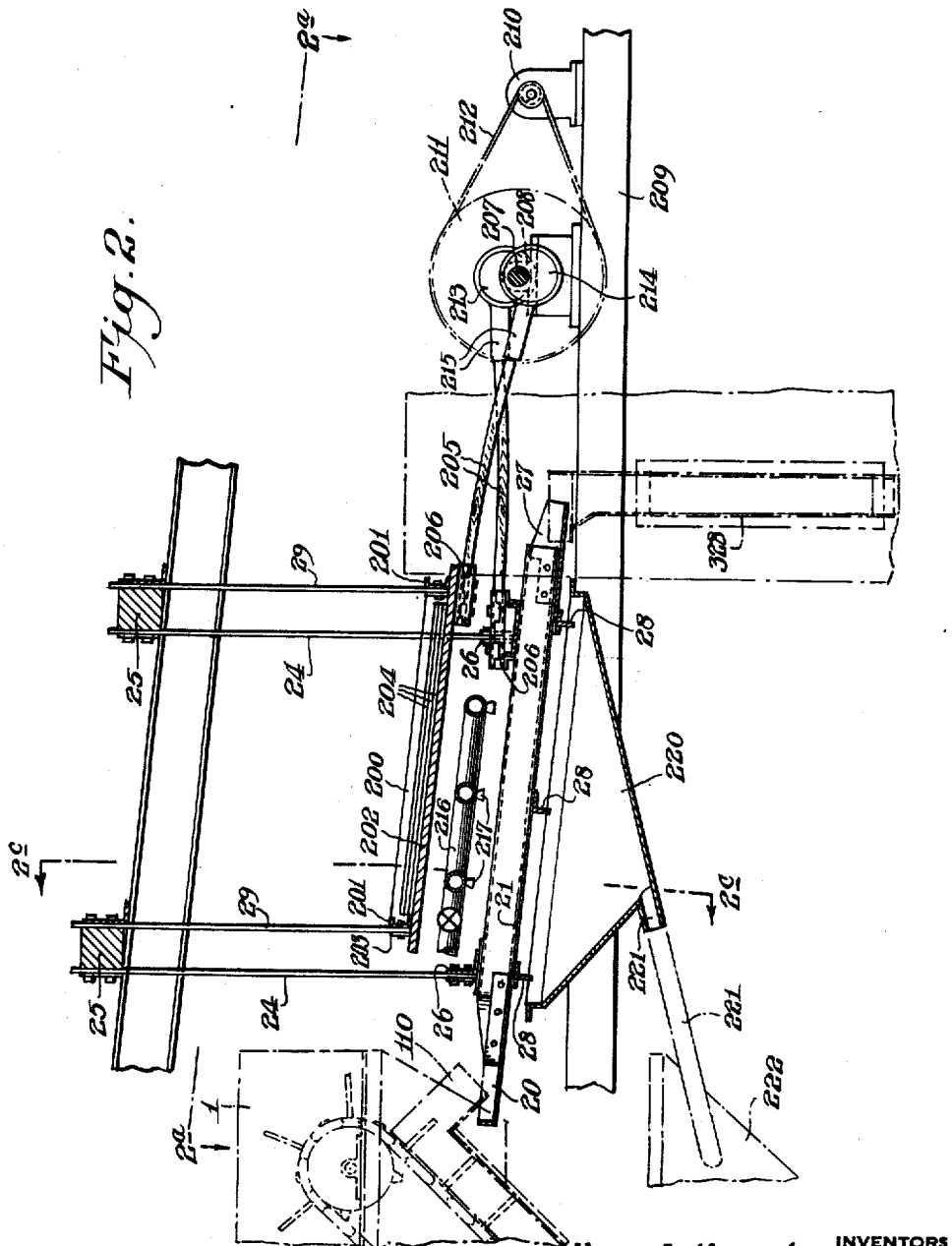

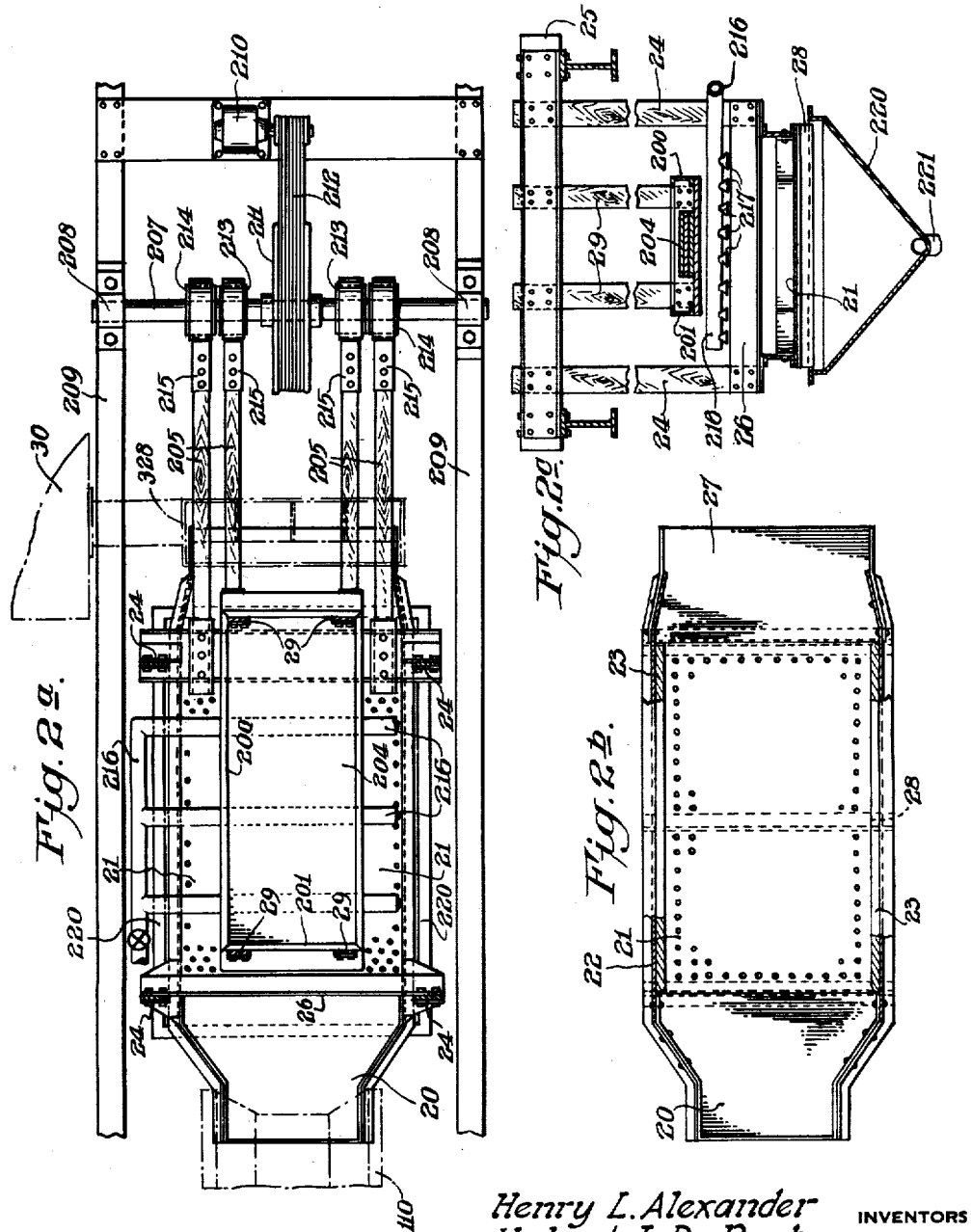

March 21, 1939. H. L. ALEXANDER ET AL 2,151,578
METHOD OF AND APPARATUS FOR ISOLATING MINERALS
Filed Feb. 7, 1939 16 Sheets-Sheet 6

INVENTORS
Henry L. Alexander
Hubert I. DuPont
Willing B. Foulke

BY

John L. Seymour
ATTORNEY

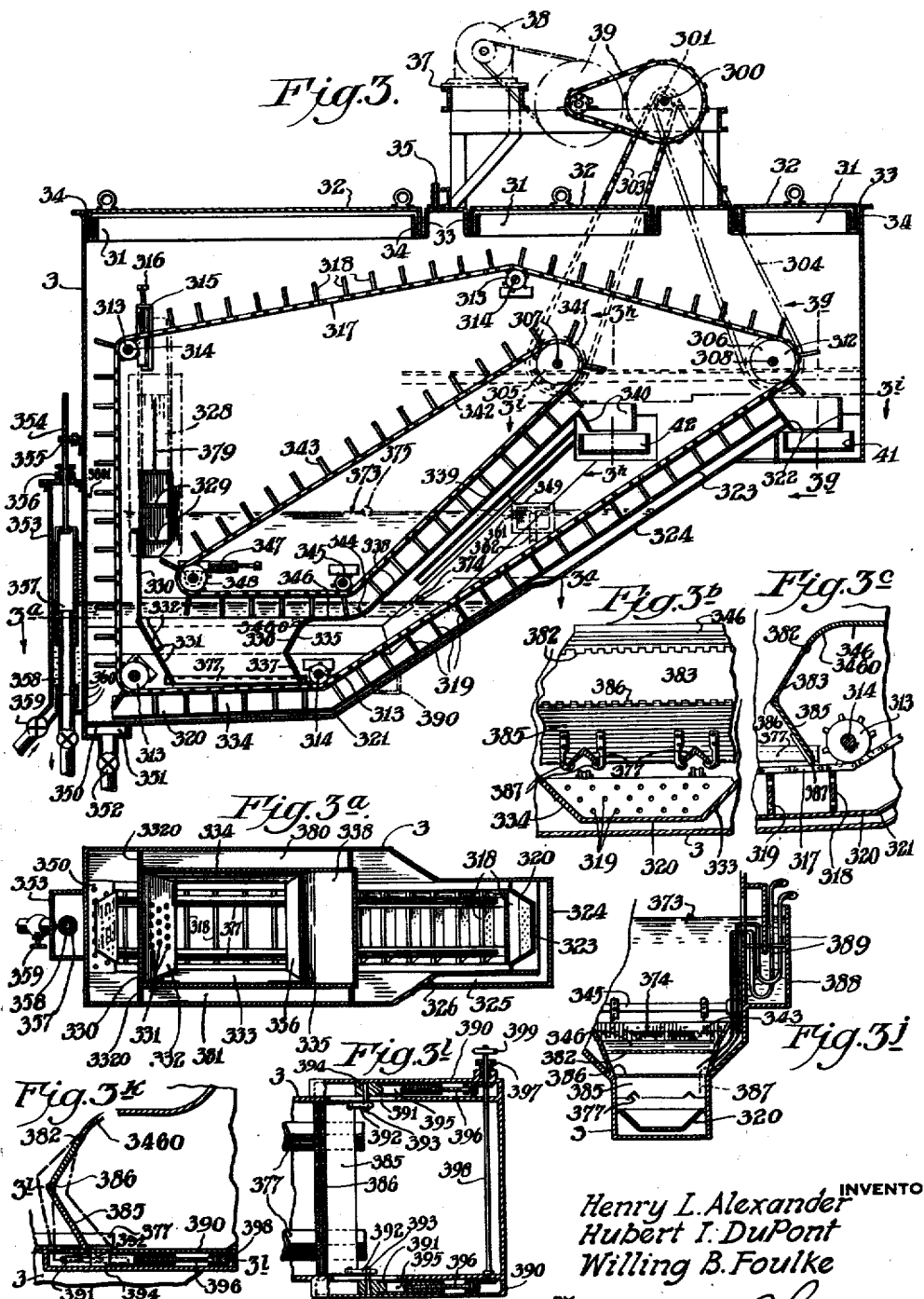

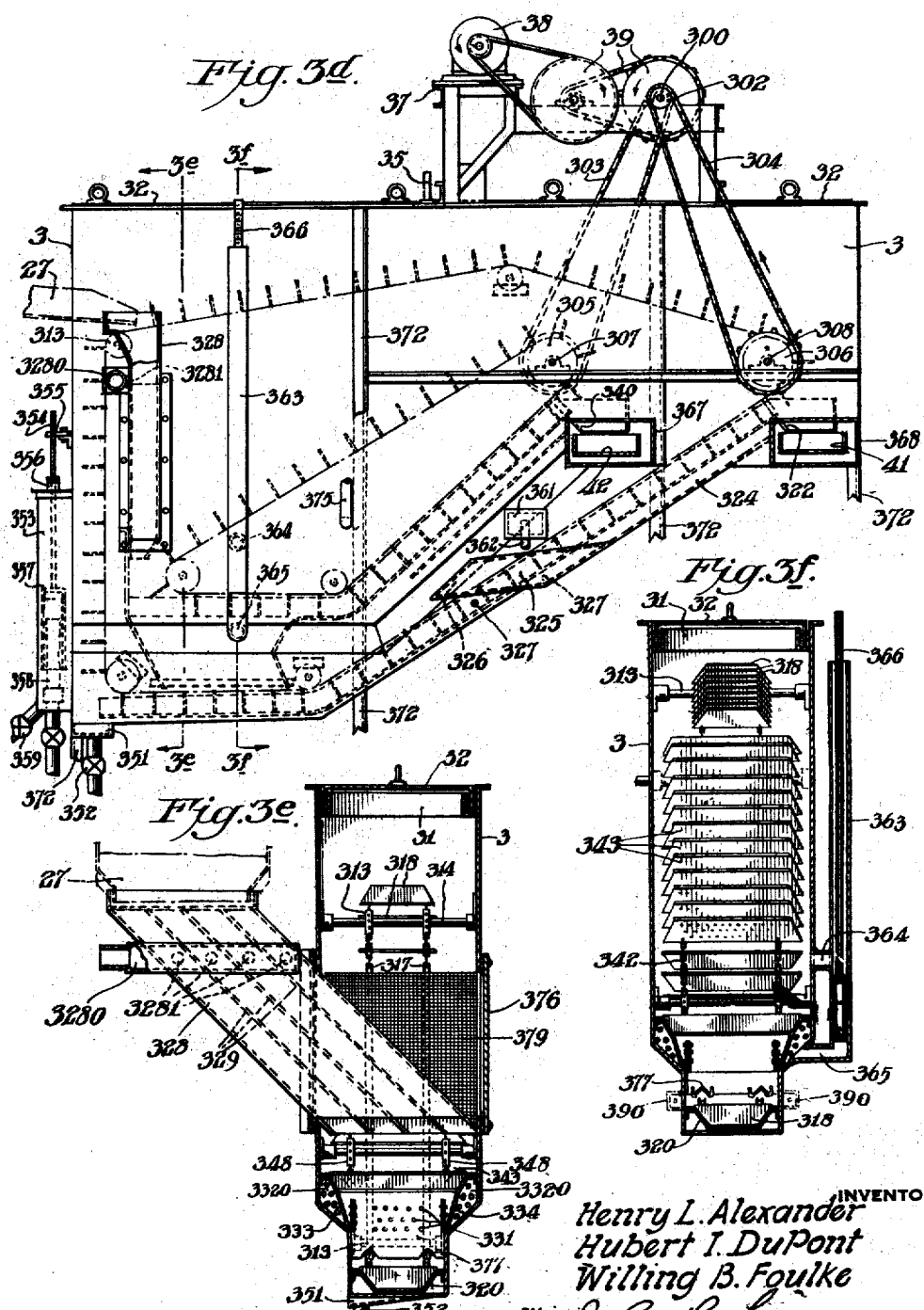

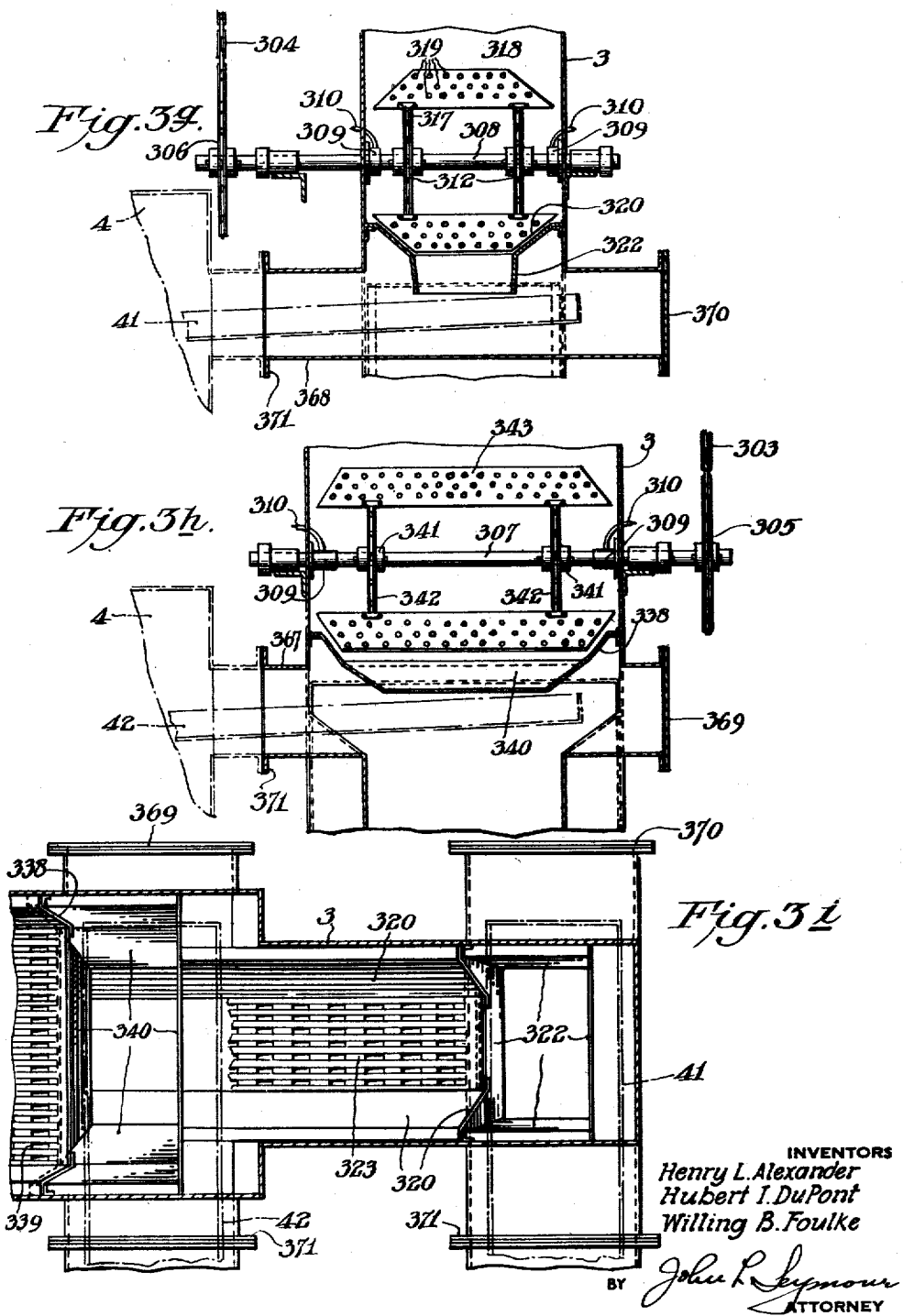

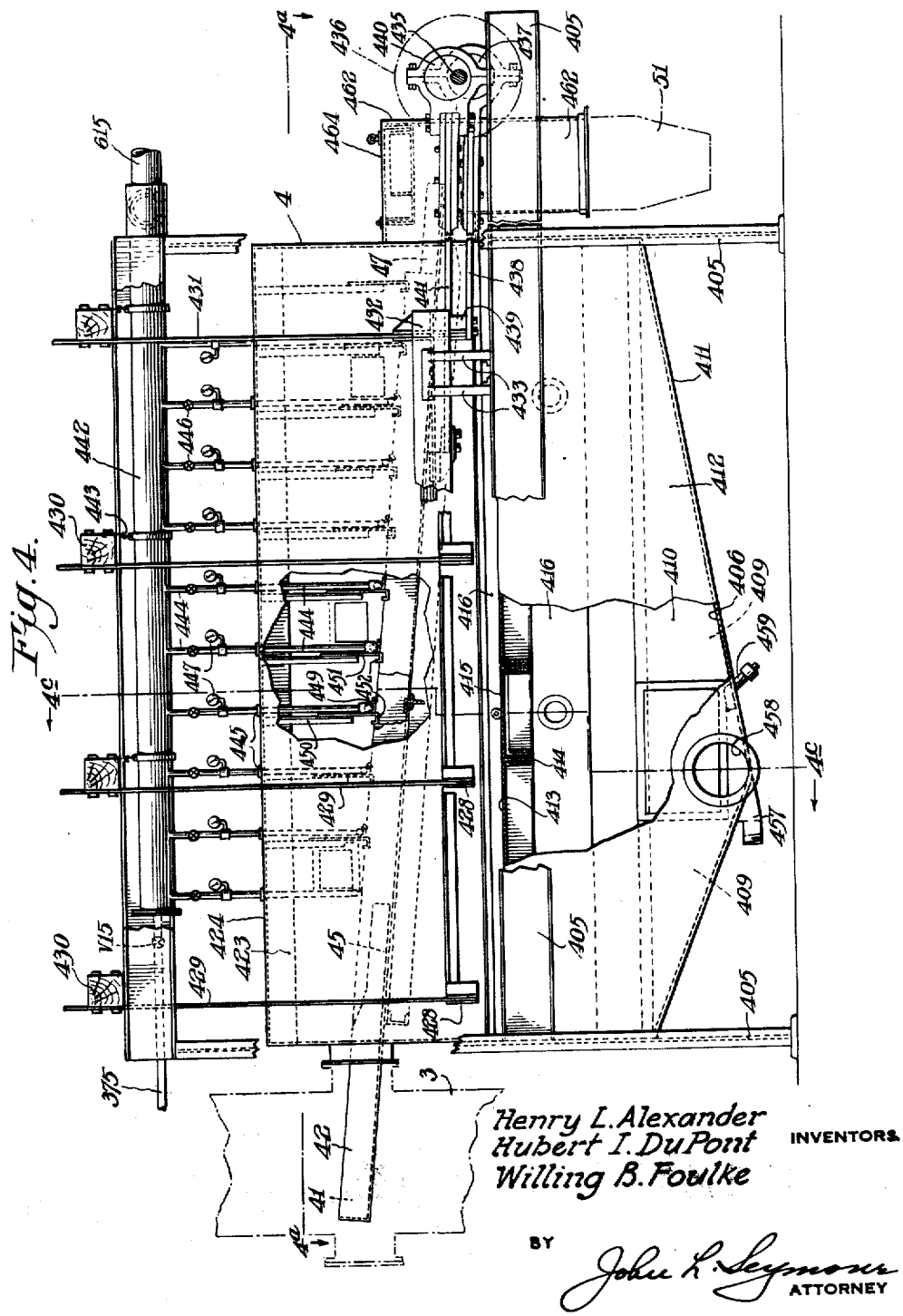

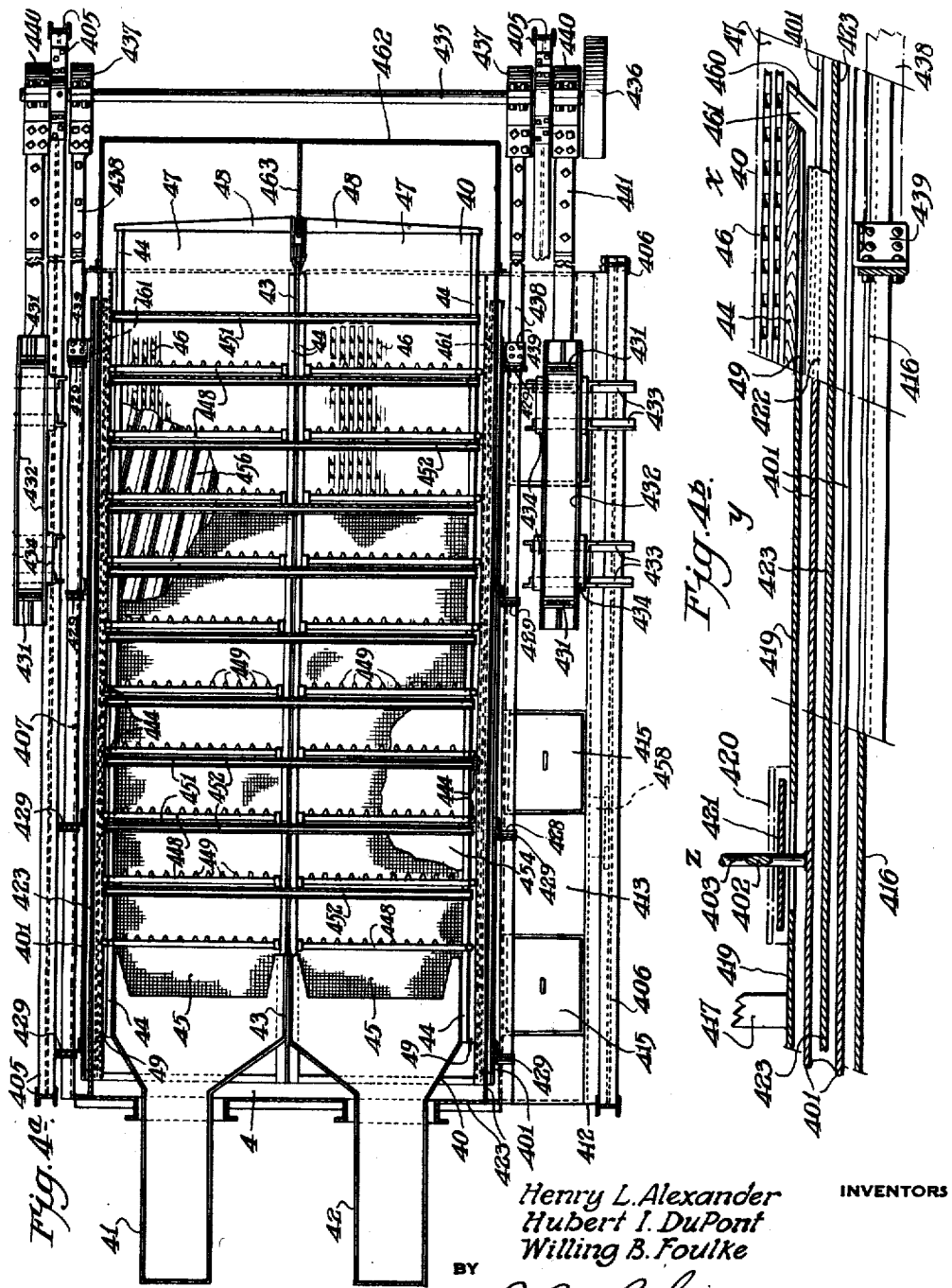

March 21, 1939.    H. L. ALEXANDER ET AL    2,151,578
METHOD OF AND APPARATUS FOR ISOLATING MINERALS
Filed Feb. 7, 1939    16 Sheets-Sheet 12
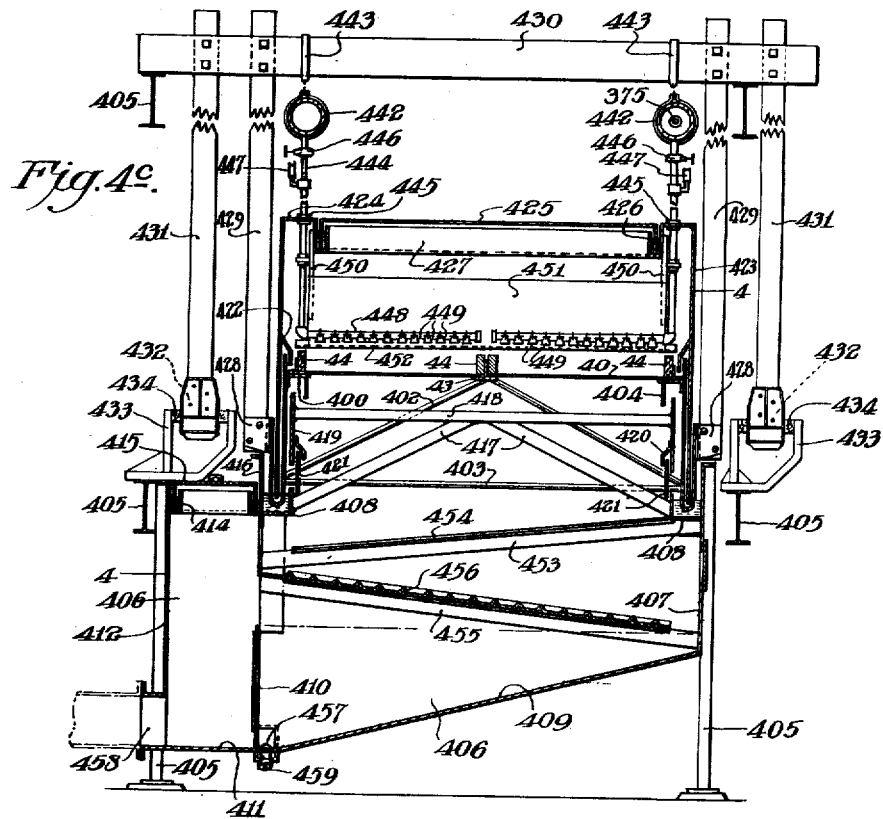
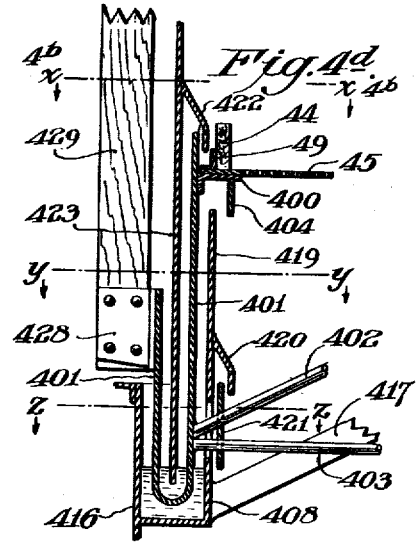
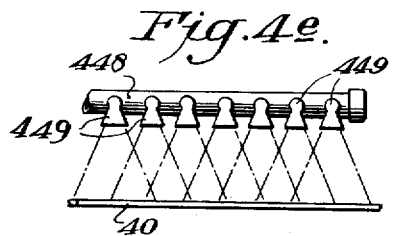
Henry L. Alexander
Hubert I. DuPont    INVENTORS
Willing B. Foulke
BY John L. Seymour
ATTORNEY.

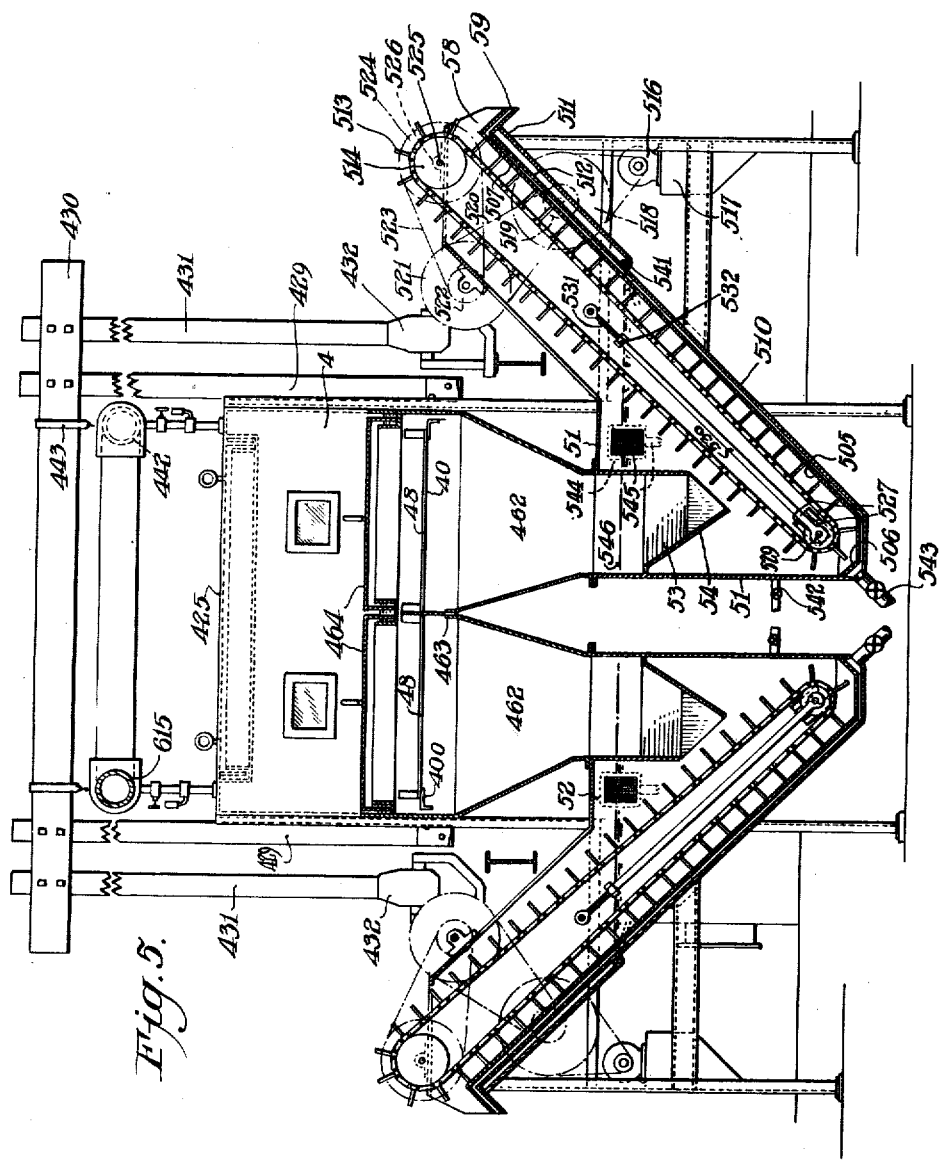

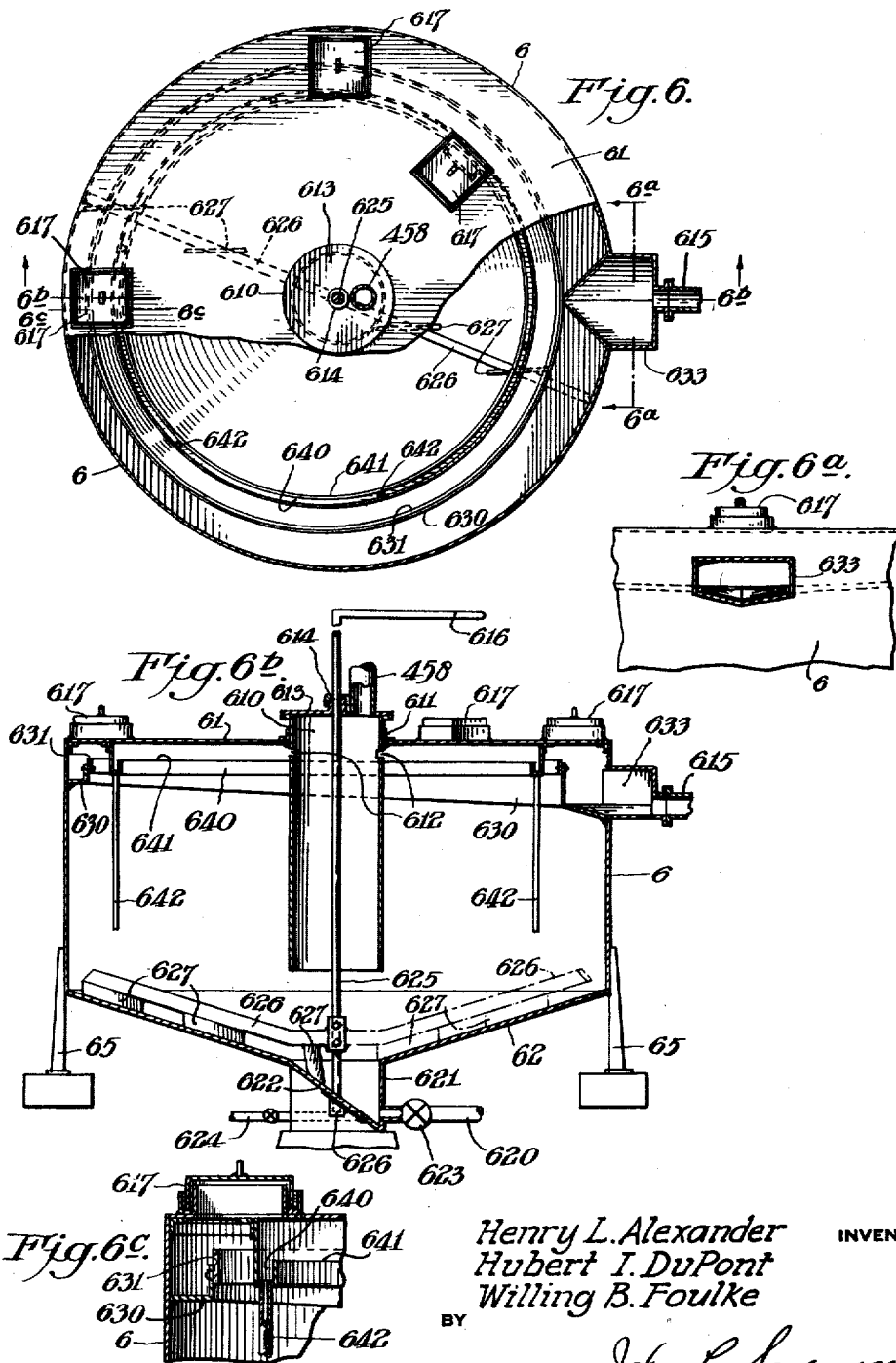

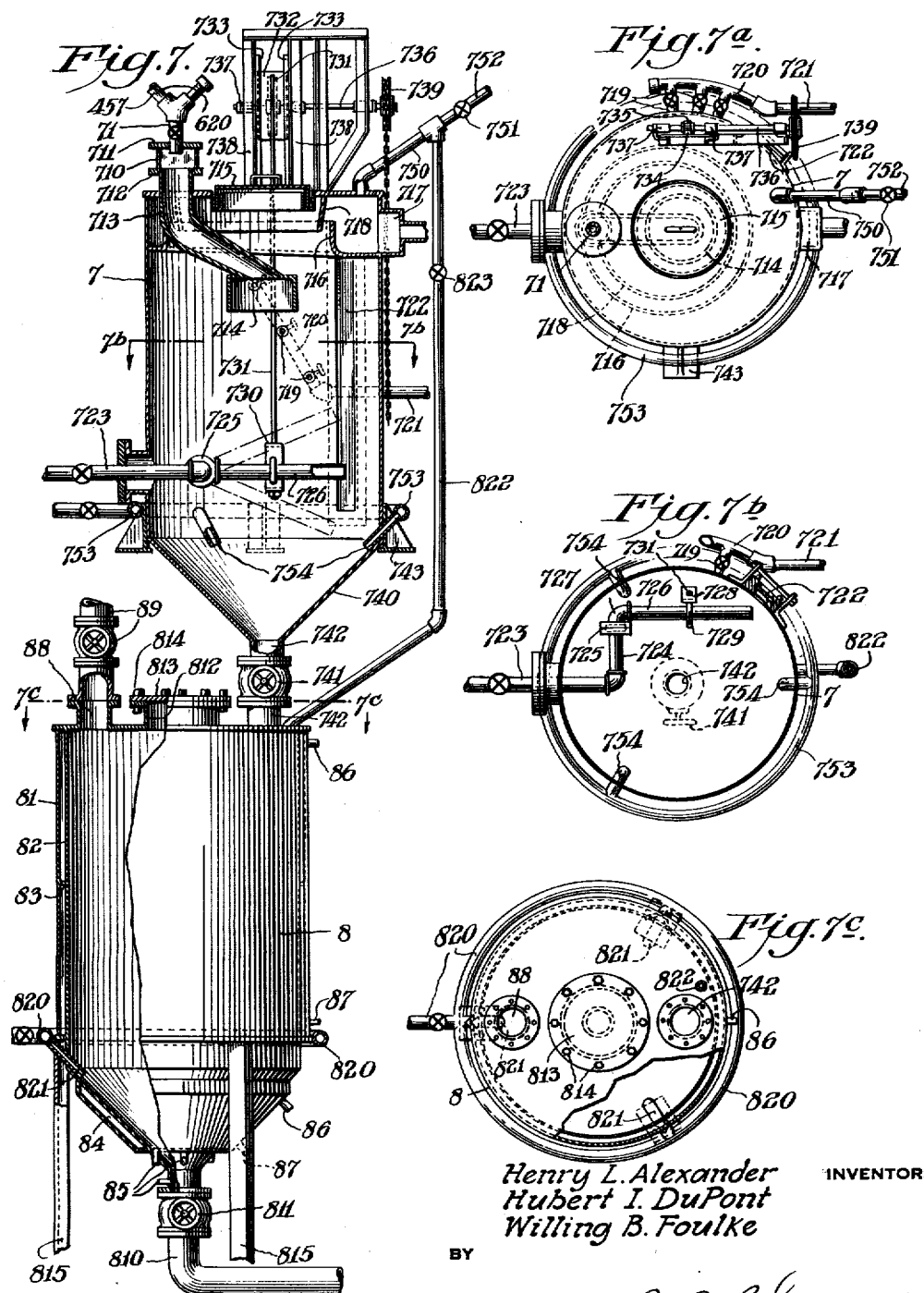

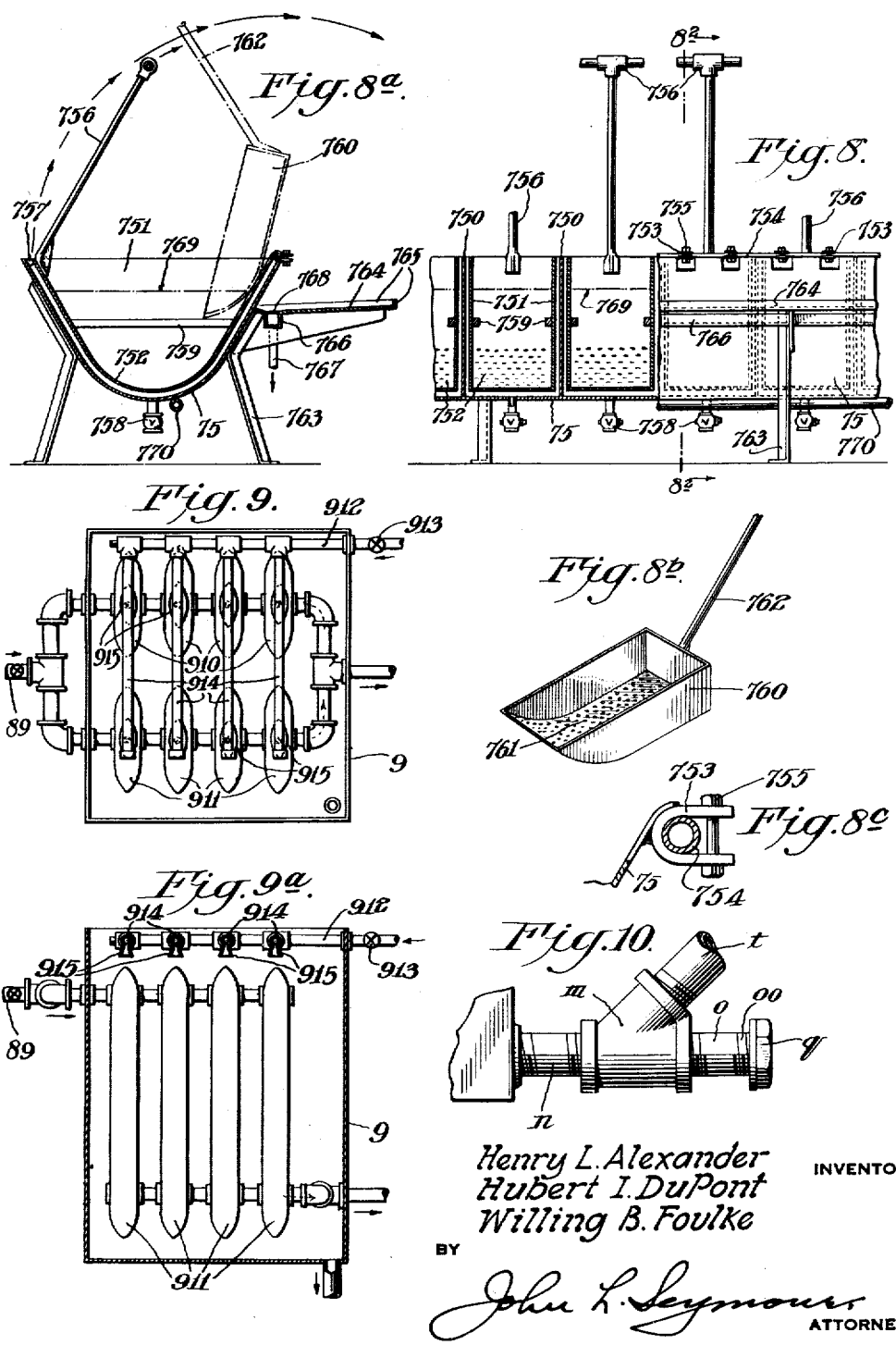

Patented Mar. 21, 1939

2,151,578

UNITED STATES PATENT OFFICE 2,151,578

METHOD OF AND APPARATUS FOR ISOLATING MINERALS

Henry L. Alexander, Niagara Falls, N. Y., and Hubert I. du Pont, Rockland, Del., and Willing B. Foulke, Media, Pa., assignors to E. I. du Pont de Nemours & Company, Wilmington, Del., a corporation of Delaware Application February 7, 1939, Serial No. 255,014 In Germany August 27, 1937

24 Claims. (Cl. 209—172)

This invention relates to the separation of minerals from gangue by the use of a liquid of specific gravity between that of the mineral and the gangue. The invention will be described as it is applied to the separation of coal from its indigenous impurities, particularly slate, a separation in which the process and apparatus are of particularly great value, but it is to be understood that this description is illustrative, not limitative.

Coal appears to have been known to, and to some small extent used by, the ancients. Its use in China at about the year 1200 is described by Marco Polo and about 1500 Agricola described a process of freeing minerals from their gangue which is the direct progenitor of the jig process of coal cleaning, which has the widest use today. In the early days of coal mining in Europe and in the United States only the thick seams were mined. Hand methods of mining were used and the use of anything except hand cleaning, or the most crude of mechanical methods, was unnecessary. As the thick seams were used up, however, it became necessary to use thin seams and seams containing veins of rock, which entailed the necessity of removing the rock before the coal could be sold. The method which came most prominently into use, and which is today the standard of separating coal and slate, depends upon the rates at which bodies of different densities sink through a liquid such as water. It is known that bodies sink through a liquid at rates which are functions of their respective densities, the denser sink the more swiftly. The standard jig washer of the industry takes advantage of this principle, but instead of permitting the solids to sink through the liquid, the liquid is forced through a screen on which the solids rest at a rate which lifts the layer of coal off the heavier slate, the coal being carried with the rush of liquid over a weir and the slate being discharged at a lower point from the screen. Jigs are highly developed and are of excellent capacity and performance. However, the competition of oil has driven coal producers to find means of cleaning coal which will be more accurate in separating useful from useless lumps and producers and inventors have turned their thoughts to those processes of separation which depend upon the parting action of a liquid having specific gravity between that of coal and that of slate.

The use of a parting liquid is to be distinguished from froth flotation. Froth flotation alters the apparent specific gravity of finely divided bodies so that they float on a liquid of less actual density. Parting processes, however, depend upon the use of a parting liquid in which one ingredient of the mixture will sink down and another ingredient of the mixture will rise to and float on the top. Certain phases of the parting liquid process are affected by the phenomenon of altered specific gravity, but they are distinguished from froth flotation.

The suggestion was made toward the middle of the nineteenth century that ferric chloride (1856), or sulfuric acid could be used as a parting liquid for the separation of coal and slate, and attempts were made in England to run the ferric chloride process in competition with the jigs, but the jigs were even then well developed, and the attempt was a failure. The proposed process was ideal in theory, however, and subsequent inventors attempted to improve it. A host of patents has been issued particularly in England and in the United States, dealing with proposed processes of the parting liquid type, but none has been successful with the possible exception of one that depends upon the parting effect of a suspension of solids such as sand or clay in water. The processes using parting media of homogeneous character are still inoperative for the reasons that the loss of parting liquid by attachment to the solids makes the process so expensive that the advantages of more accurate separation are lost; the processes themselves, being crude and undeveloped, are incapable of competing with the highly developed processes already in use in the industry; they are incomplete processes, lacking a number of elements essential to success; and the presence of parting liquids on the coal makes the coal inferior in certain uses. Prior to our invention these objections were known, but no way of overcoming them had been discovered.

It is an object of this invention to prevent the adhesion of an organic solid and an organic liquid. Another object and also a principal object of the invention is to separate coal from impurities by the use of a parting liquid having a specific gravity intermediate that of the coal and the impurities and comprising an organic liquid. Another object of the invention is to prevent the adhesion of coal and other carbonaceous solids and hydrocarbon liquids. Another object of the invention is to present to the mining industry a coal preparing apparatus capable of using the new process in economical competition with the best prior art processes. Another object of the invention is to apply aqueous protective films to minerals that are not readily wet by water by means of film stabilizers, to list representative and various members of the class of film stabilizer, to define the said class, and to disclose a definitive method applicable to all known substances by means of which any substance, regardless of its chemical structure or physical condition, can be known qualitatively and quantitatively in its relative efficiency as a film stabilizer. It is also an object of the invention to produce minerals for delivery with a preselected gangue content. Another object of the invention is to readily determine the gangue content and specific gravity of mixed solids. Other objects of the invention will be in part apparent and in part more fully hereinafter set forth.

The objects of the invention are accomplished, generally speaking, by wetting the materials to be separated with an aqueous solution containing a film stabilizer, washing the materials with water, immersing them, preferably under hermetical seal, in a parting liquid of specific gravity intermediate the specific gravities of the materials to be separated, withdrawing the materials from the said parting liquid after separation, scrubbing the separated constituents, preferably under hermetical seal, with a liquid and ejecting them from the process, fortifying the aqueous solution with film stabilizer and returning it for reuse, recovering parting liquid from the scrubbing liquid in a semi-static settling system involving continuous flow and distillation of the sludge, and reusing the scrubbing fluid.

The broader objects of the invention are accomplished, generally speaking, by immunizing minerals (or other solids, or liquids) which are not readily wet by water, or which are more readily wet by organic liquids insoluble in water than by water, against contamination by such organic liquids by applying thereto an aqueous solution of a film stabilizer, preferably in dilute solution, before they are brought into contact with the organic liquid. The film stabilizers are surface active substances which in aqueous solution produce an optimum differential change in surface tension with respect to concentration at concentrations of no more than 2% and which form stable aqueous surface films in the presence of organic liquids essentially insoluble in water.

The objects of the invention are also accomplished in part by the association of apparatus, and by the details of the process and apparatus which are more completely elsewhere herein described.

In order to make the drawing more easily comprehensible, the first figure has been called the key figure; the steps of the process have been numbered from 1 to 9 consecutively and the figures of the drawings have been numbered to correspond with the steps of the process to which they refer. For example, on the key figure the numeral 3 refers to the third step of the process which involves the actual parting step. The sheets which relate to that step are numbered from Figure 3 to Figure 3l. Furthermore, the parts of apparatus belonging to a certain step in the process are given a number the first of which corresponds to the number of the step in the process. Thus, the elements of the apparatus shown in Figures 1 to 1f inclusive begin with the number 1.

In the drawings Figure 1 is a cross-sectional view of an apparatus capable of satisfactorily performing the step of coating the coal with a solution of water and a film stabilizer; Figure 1a is a cross-section on the line 1a, 1a of Figure 1; Figure 1b is a plan view of the hopper and conveyor tank shown in Figure 1; Figure 1c is a cross-section on the line 1c, 1c of Figure 1; Figure 1d is a plan view of the conveyor pan taken on the line 1d, 1d of Figure 1; and Figure 1e is a perspective view partly in section showing details of the conveyor pan and flights; Figure 1f is a detail; and Figure 1g is a detail.

Figure 2 is a cross-section through an apparatus capable of performing the second step in the process. Figure 2a is a plan view on the line 2a, 2a of Figure 2; Figure 2b is a plan view of the shaker screen shown in Figure 2; Figure 2c is a cross-section on the line 2c, 2c of Figure 2; Figure 2d is a plan view of the settling cone which serves for the recovery of film stabilizer washed from the coal by the apparatus of Figures 2 to 2c; Figure 2e is an elevation partly in section of the said settling cone.

Figure 3 is an apparatus capable of carrying out the third, parting, step of the process; Figure 3 is a vertical section on the line A—A of the key figure; Figure 3a is a cross-section on the broken line 3a, 3a of Figure 3; Figure 3b is a detail, partly in section, of a preferred modification of wedge 336—337; Figure 3c is a section on Figure 3b; Figure 3d is an elevational view partly in phantom and partly in section showing the parting apparatus; Figure 3e is a section of line 3e, 3e of Figure 3d; Figure 3f is a section of line 3f, 3f of Figure 3d; Figure 3g is a section on line 3g, 3g of Figure 3; Figure 3h is a section on line 3h, 3h of Figure 3; Figure 3i is a section on line 3i, 3i of Figure 3; Figure 3j shows means for operating the preferred embodiment of Figures 3b and 3c; Figures 3k and 3l show a preferred method of operating the apparatus of Figures 3b and 3c.

Figure 4 is an elevational view partly broken away and in section showing the scrubbing apparatus; Figure 4a is a section on the line 4a, 4a of Figure 4; Figure 4b is an enlarged section on the line 4b, 4b of Figure 4d, the left hand section of Figure 4b taken on the line Z—Z of Figure 4d; the middle section of Figure 4b being taken on the line Y—Y of Figure 4d; and the right hand section of Figure 4b being taken on the line X—X of Figure 4d; Figure 4c is a section on the line 4c, 4c of Figure 4; Figure 4d is an enlarged section of the sealing mechanism shown in Figure 4c; Figure 4e is an enlarged section of a spray pipe with nozzles showing the overlap of the sprays.

Figure 5 discloses the apparatus for receiving material discharged from the scrubbing process, for sealing the scrubbing process, and for discharging the material.

Figures 6, 6a, 6b, and 6c disclose the second, or main, settling tank, being the second step in the heavy liquid recovery system of which the first step is the settling tank, the apparatus which is found within the scrubbing section. Figure 6 is a plan view partly cut away and in section of the main settling tank; Figure 6a is a section on the line 6a, 6a; Figure 6b is a vertical section on the line 6b, 6b; Figure 6c is an enlarged section on the line 6c, 6c of Figure 6.

Figures 7 to 7c refer to the third settling tank of the series, so-called the sludge trap, and to the still. Figure 7 is an elevation partly in section of the sludge trap and still as assembled; Figure 7a is a plan view of the sludge trap; Figure 7b is a cross-section of the sludge trap on line 7b, 7b; Figure 7c is a plan view of the still on the line 7c, 7c of Figure 7.

Figures 8 to 8c do not refer to section 8 of the apparatus, but to an apparatus by means of which the efficiency of separation can be expeditiously determined. Figure 8 is a plan view of a portion of the apparatus partly in section and Figure 8a is a cross-section on the line 8², 8² of Figure 8. Figure 8b is a drawing of a scoop; Figure 8c is an enlarged detail of the hinge connection.

Figure 9 and Figure 9a are views in plan and elevation, respectively, of the condensers.

Figure 10 is a view of the pipe joints which are used throughout the apparatus.

Figure 2D:
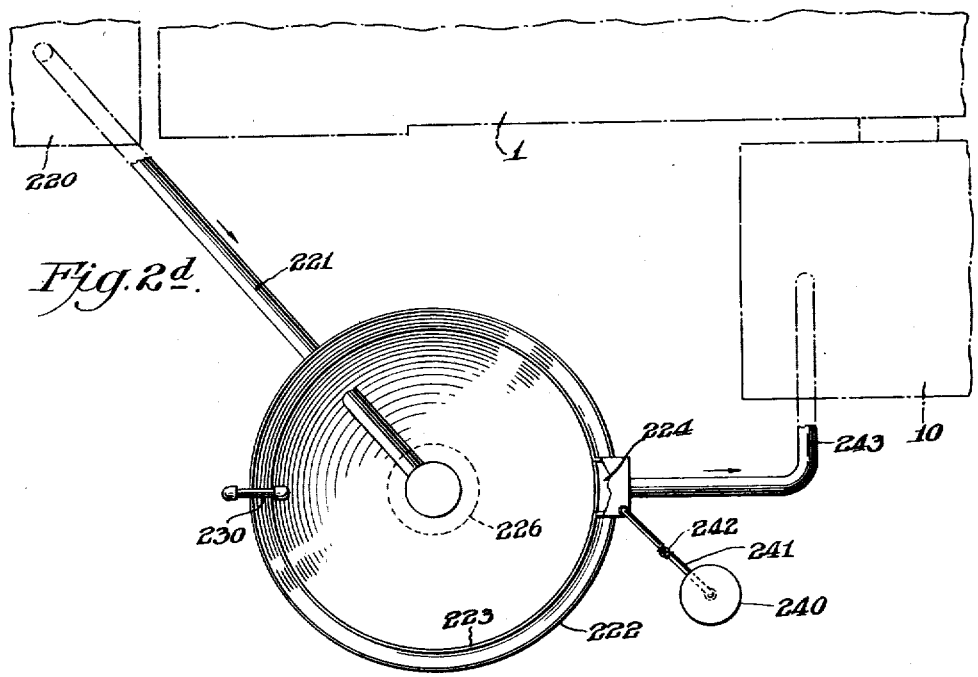
Figure 2E:
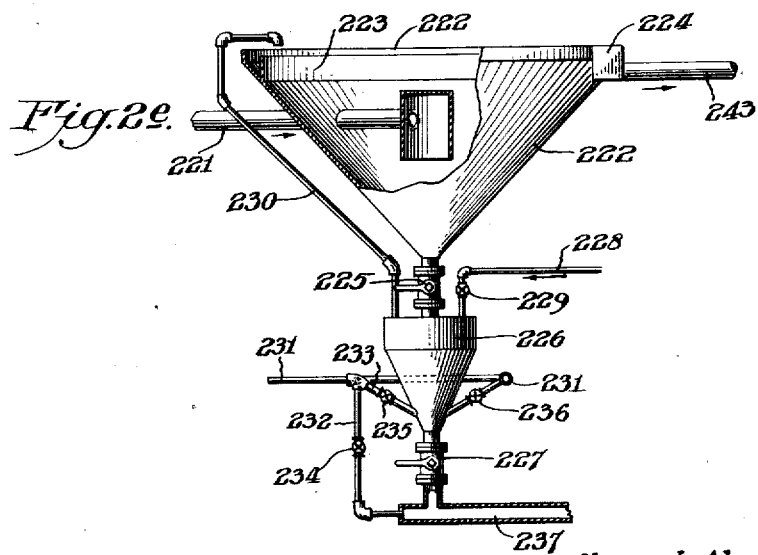

In order that the invention may be understood in general before being described in particular, it will first be described with reference to the key figure.

1 indicates a feed conveyor box; 10 indicates a feed hopper attached thereto; 124 is a means for maintaining the liquid level in the tank and hopper at a point above the opening between the hopper and the box; 11 is a chute for supplying broken coal mixed with indigenous impurities to the feed hopper 10; 113 is a conveyor within the hopper which gathers the wetted material and ejects it from chute 110. In this first step of the process the coal is treated with a liquid comprising water and a film stabilizer. The liquid utilized in this section of the apparatus and in any similar pretreating step is a dilute aqueous solution of a film stabilizer, the concentration of which is maintained substantially constant.

The mixed coal and slate, having been ejected from chute 110, are caught on screen 21 and are subjected to the second step of the process, which comprises washing the treated coal with water from sprays 216. In order to simplify the comprehension of the invention the path of the coal through the apparatus will be traced to completion before the treatment of used liquids is considered. From the shaker screen 21 and the second step of the process 2 the coal is dropped into chute 328 and is carried thereby into the separating chamber where the heavy material is separated from the light by a liquid medium of intermediate specific gravity. After the separation the coal is drained of entrained liquid and transferred to the apparatus and step 4 of the process which is, with respect to the coal, a scrubbing process which removes from the coal substantially all vestiges of parting liquid. In this scrubbing step the separated coal and s.ate are subjected to a vigorous scrubbing by water, under pressure, which comes from headers 442. The third and fourth steps of the process are preferably carried out in a hermetically sealed system. The washed coal and slate are ejected through split boot 462 into the water-sealed conveyors 5 which serve to give the coal a last rinsing and to prevent the escape of vapors from the sealed units 3 and 4. From the conveyors 5 the coal may be discharged to storage or to a railroad car for transportation to the place of use, and the slate may be discarded.

Having described the process in general as it acts upon the coal, the process will be described in its relation to the liquids used: When the coal has been washed in section 2 of the process with water from pipes 216, the water together with the liquid which it washes off the coal passes through the screen 21 and is caught in the hopper 220 from whence it is carried by pipe 221 to the so-called slit cone 222. The sludge is entrapped in the chamber 226 and eventually removed through pipe 237. The comparatively clear liquid from the washing step, 1, of the process, diluted with the liquid from sprays 216, flows over a weir at the top of the cone, has its concentration of film stabilizer adjusted by additions from the tank 240, which contains film stabilizer in more concentrated solution, or undissolved, and the line 241 to a percentage that gives satisfactory results as a pretreating solution, and passes through the pipe 243 to the hopper 10 where it is used again for the treating of incoming coal.

When the coal passes through the scrubbing section 4, it is vigorously scrubbed with water from the headers 442. The coal passes on and the water passes through the screen which carried the coal, and together with sludge and heavy liquid, gathers in tank 406 which forms the lower part of this section of the apparatus. From that tank the sludge is removed through pipe 457 to be discharged into the sludge trap 7, and the liquid containing lighter suspended matter is discharged into the main settling tank 6. Over the weir at the top of the main settling tank 6 flows comparatively clear liquid to be pumped through pipe 615 to headers 442 for reuse in the washing section. From the bottom of the tank 6 the sludge is drawn off through pipe 620 and pumped to the sludge trap 7. From the sludge trap 7 on some occasions substantially the entire contents are dropped into the still 8 for steam distillation, but in normal and preferred operation the matter is allowed to settle into three layers, the bottom of which is largely solid, the middle of which is largely heavy liquid and the upper of which is substantially water. Through the pipe 717 which leads to a weir at the top of the tank and through valves 719 and pipe 721 the water is drawn off and returned to the tank 6. The heavy liquid is pumped through pipe 723 to the used liquid storage tank. Finally, the remaining sludge is dropped into the still 8 for steam distillation. The water, together with vaporized heavy liquid, passes through pipe 88—89 to condenser 9 which is diagrammatically shown on this figure, and from condenser 9 to cooler 95 and water separator 96, wherein the heavy liquid is separated by a gravity separation from water. The separated heavy liquid is carried through pipes 961 and 962 to the new liquid storage tank 963 or the used liquid storage tank 964, respectively. 965 is a vent pipe connecting the used liquid storage tank with the new liquid storage tank and 966 is a vent from the new liquid storage tank. The used liquid storage tank can be replenished from the new liquid storage tank through meter gauge 967, which gives a check on the amount of liquid used in the system. The level of heavy liquid in the parting section 3 is maintained by injecting liquid from the used storage tank 964 through pipe 359. Excess of heavy liquid escapes over a weir through pipe 358 and back to the used liquid storage tank. In the drawings a circle with the letter $p$ indicates a pump and a circle with the letter $x$ indicates a valve; pipes 358—359 are joined by a pipe in which is valve V20.

There were many reasons for the failure of the prior art processes which attempted to use a parting liquid, but the single reason which rendered the processes incapable of use and which was insuperable, was the lack of an agent which would maintain a water film on the coal, or other mineral not normally quickly wetted by water, or not preferentially wetted by water. The idea of putting a film of water on coal had been tried and found to be a failure. It would doubtless have occurred to certain inventors that, if water itself was a failure, possibly the use of a wetting agent would put on a thicker or more complete film of water and reduce the liquid losses. Such, however, was not the case. For instance, the use of the common wetting agents, sodium - petroleum - sulfonate, stenol-acid - phthalate, dilauryl - ammonium - adipate, and sodium-lauryl-sulfate and others produced no improvement and in many cases actually increased the loss of heavy liquid. Those experiments, and others, showed that the problem involved was not one of mere wetting. In carrying out our experiments to develop means of preventing the adhesion of the parting liquid to the coal, or to other minerals not quickly and preferentially wet by water, we discovered that the loss of parting liquid could be reduced by applying an aqueous solution of a film stabilizer to the coal before entering the coal in the parting liquid. The members of the class of film stabilizers come from many chemical groups having diverse properties; nevertheless certain chemical groups fall as a whole within the class. Certain members of other groups belong even though the class as a whole is not included, an example of which is that some compounds known to have utility as wetting agents are included because they also possess the properties of film stabilizers.

Exemplary of the film stabilizers are the following: It is to be understood that this list is exemplary; that it is not limitative; and that it is designed to disclose illustrative examples rather than to be a catalogue of members. Any person interested in cataloging all film stabilizers from the millions of compounds known, can do so by following the definitive process which will be given after the list: catechol, resorcinol, quinol, pyrogallol, dihydroxy diphenyl, dihydroxy chlorbenzene, gallic acid, alizarin, arbutin, ruberythric acid, aloin, aesculin, apiin, glycyrrhizin, pelargonin, tannic acid, digitalin, saponin, parillin, naphthol sulfonic acid, naphthol disulfonic acid, naphthylamine disulfonic acid, amino naphthol sulfonic acid, dihydroxy naphthalene disulfonic acid, compound #8, being a condensation product of naphthalene sulfonic acid and formaldehyde, ID-I, being a reaction product of phenol sulfonic acid and formaldehyde, fastan, tanak, irgatan, sulfite cellulose, methyl cellulose, starch acetate, starch, pectin, gum arabic, gum mesquite, gum cherry, gum shiraz, gum ghatti, locust bean gum, gum karaya, gum tragacanth, carrageen, dextrin, inulin, egg albumin, blood albumin, vegetable albumin, fibrin, edestin, glycinin, alkali soluble protein (sample from corn particularly good), gliadin, casein, gelatin, bone glue, hide glue, rabbit glue, haemoglobin, polyvinyl alcohol, hexamethylene tetramine, triethanolamine, sodium phosphate, oxalic acid, potassium permanganate.

The film stabilizers are surface active substances which in aqueous solution produce an optimum differential change in surface tension with respect to concentration at concentrations of no more than about 2% and which form stable aqueous surface films in the presence of organic liquids essentially insoluble in water. Their function is physical rather than chemical and their definition is expressed of necessity in physical or physical-chemical terms. The degree of their solubility in the parting liquid is important because too great solubility in the parting liquid results in the leaching of the stabilizer out of the water film and its consequent breakdown. Consequently, solubilities of surface active substances greater than about .3% to about .5% should be avoided. Another characteristic of these surface active substances is their faculty of decreasing surface tension. The lowering of surface tension per se is probably not the cause of film stabilization, but the magnitude of the lowering, together with the concentration of the dissolved substance causing the lowering, are indications of the existence at the surface of the film of the conditions which cause film stabilization. A given solution forms the most stable films when the greatest difference exists between the concentration of the film stabilizer in the surface layer and its concentration in the solution as a whole. The film stabilizing tendency may be expressed by the ratio of the change in surface tension to the concentration at which a surface tension change is most abrupt. For example, the addition to pure water of .001% of polyvinyl alcohol produces a surface tension change of 3.60 dynes as measured on the du Nouy tensiometer, a ratio of 3.60 to .001 or 3600 to 1. A similar change of glycerol concentration in water at 10% changes the surface tension by only .5 dyne. The ratio in that instance is that of .5 to 10 or .05 to 1. On this basis polyvinyl alcohol at .001% concentration is 72,000 times as good a film stabilizer as glycerol. The film stabilizers produce a relatively great ratio of change in surface tension for increments of addition at concentrations less than about 2%, and some of the best produce excellent results at concentrations as low as .05%. The entrapment of air on the surface of the mineral as it plunges into the prewetting bath does not impair the action of the stabilized film. The stabilized films are stable at air-liquid interface and also at liquid-liquid interface, in both cases it being understood that the general conditions as hereindescribed apply. Taking a .5% solution as a standard, those surface active substances are useful film stabilizers which show by the addition of that concentration to pure water a surface tension decrease of about .5 dyne or more.

Certain compounds are not themselves film stabilizers but react with materials in the system to produce compounds which are film stabilizers. To this class belong sodium phosphate, oxalic acid and potassium permanganate. It is within the scope of our invention to add the stabilizers originally or to produce them in the system.

A number of organic materials dissolve in water to give colloidal rather than true solution. The individual micelles are stabilized in the colloidal state because of their highly hydrated condition, and are thereafter classed as "emulsoid" or "hydrophile" colloids, as distinguished from the "suspensoid" or "hydrophobe" colloids which are stabilized by the presence of an electrical charge. The emulsoid colloids, examples of which are found in the above list, are useful as film stabilizers. Among the subclasses of emulsoid colloids are proteins and carbohydrates. Among the subclasses of proteins are the albumins, the globulins, the prolamins, the phospho-proteins, the sclero-proteins, and the chromo-proteins. Among the carbohydrates are cellulose derivatives, starches, pectin, gums, seaweed extracts. Emulsoid colloid solutions are characterized by relatively high viscosity; a property which can be used to make a rough demarcation between that class and other classes by stating that substances which have roughly five or more times the viscosity-increasing effect of sugar are included, but the true test of film stabilizing efficiency with these compounds is apparently the emulsoid colloidal nature of the compound, not viscosity or any other mere attribute.

A rough but not entirely accurate test for film stabilizers is to agitate a typical parting liquid of the type used in this invention with water in the presence of a small quantity of the substance being investigated. Many film stabilizers when so treated produce a persisting interface film which can be seen with the naked eye, and which appears to have an individual existence quite apart from the water or the organic liquid, furnishing further evidence that the properties of active agents are not merely those of wetting agents.

Another class which is shown to be effective by the illustrated members in the preceding list are the glycosides. The best compounds of this type appear to be those in which the aglucone is an unsymmetrical polyhydroxy aromatic compound. The glycosides from monohydroxy and symmetrical aglucones are of less efficiency. The principal types of glycosides are, however, actually based on the unsymmetrical and polyhydroxy type and they are all effective. Representatives of the more important classes are the phenolic type, such as arbutin, salicin, and tannic acid; the anthraquinone type, such as ruberythric acid and aloin; the coumarin type, such as aesculin; the anthoxanthin type, such as apiin and glycyrrhizin; the anthocyanin type, such as pelargonin; the digitalis type, such as digitalin; and the saponin type, such as parillin.

Since the large number of known chemical compounds and the diversity of their constitutions and attributes make a listing of the entire group of film stabilizers too wasteful in time and too expensive in money to be practical, the following definitive method has been developed as an additional means of defining the class as a whole. This method is applicable to all known substances: A number of tubes having transparent bottoms and equal diameter are filled to equal depth with solutions of dye and kerosene, the tubes being arranged so that light will travel up through the transparent bottoms through the dye solution. The tubes are arranged in the order of increasing percentages of dye. For instance, the first tube may contain 1% of an oil-soluble dye, such as oil red, the second tube, 2%, etc. A sample of coal of unknown properties is agitated gently in plain water, the agitation being controlled so that degradation of the coal will be kept at a minimum. The agitation continues for an exact period of time, such as fifteen seconds. The coal is then separated from the water and is immersed for an exact period of time, such as fifteen seconds, in an essentially water insoluble organic liquid, such as pentachlorethane, in which has been dissolved a small percentage, such as 0.1%, of the same dye which is found in the kerosene tubes. The coal is separated from the organic liquid, is vigorously sprayed with water for an exact period of time, such as twenty seconds, and is immersed in a weighed quantity of kerosene in which it is gently agitated for an exact period of time, such as fifteen seconds. The coal and the kerosene are separated; the kerosene is filtered; the coal is weighed, and a tube of the same size as the color tubes is filled to identical depth with the kerosene extract. By comparing the color of the kerosene extract with the color in the tubes there is obtained by simple mathematics an accurate statement of the liquid loss on the particular type of coal constituting the sample.

Liquid losses vary according to the type of coal. A compact, hard anthracite shows a relatively low liquid loss, whereas the friable bituminous coal which is continually presenting fresh surfaces by degradation and which is filled with fine cracks and fissures into which the liquid can penetrate, shows a relatively great loss.

In the second step of the defining process a sample of the same coal is immersed for an identical period of time in an aqueous solution of the compound whose efficiency is to be determined, for example, in a .1% solution of starch acetate, and the foregoing procedure is otherwise identically followed. Those compounds whose presence in the second step produces a color of less intensity than the color produced in the first step are film stabilizers, and their efficiency as such is indicated with accuracy by the difference in shade. The foregoing definitive method requires only a few seconds for completion and is in all cases applicable and in all cases accurate within practical limits. The efficiency of film stabilizers differs according to the type of coal, for the reasons above set forth, according to the nature of the film stabilizer, and according to the percentage of the film stabilizer used. In some instances .05% of film stabilizer produces optimum results. In other instances 1% or even more concentrated solutions of film stabilizer are required to obtain optimum efficiency.

This definitive method also defines the characteristics of each type of coal and enables the operator to be sure that the film stabilizer he is using is the best type for the particular type of coal and to be sure that it is being used in the percentages which produce the optimum result.

By this method reductions in parting liquid loss of 85% or greater are customary. It will, consequently, be observed that the method presents a process of immunizing the surface of a solid poorly wetted by water against the adhesion of an organic liquid of a very great efficiency.

The solubility of the compound affects its utility as a film stabilizer in the coal process. Some compounds are so insoluble in water or in combinations of water with cheap solvents that are not miscible with the parting liquid that they are of no practical value. It may be stated as a practical matter, consequently, that in the coal industry only water soluble compounds, or compounds soluble in mixtures of water and cheap solvents that are not soluble in the parting liquid are of practical interest. In industries concerned with materials of greater unit value the feature of cost disappears and any film stabilizer may be used without regard to cost.

Referring to the numerals on the drawings, I indicates generally the section for treating the coal with film stabilizer; 10 is a hopper; 11 is a chute leading into the hopper; 12 is an inclined bottom of the hopper; 13—13 are inclined sides of the hopper; 14 is a wall of the hopper; 15 is an opening in the wall 14; 16 is a gate which closes the opening in the wall of the hopper; 17 is a channel-shaped member attached to the gate; 18 is a rack on the channel-shaped member; 19 is a channel-shaped member within which the first said channel-shaped member can slide vertically; 100 is a pinion meshing with the rack 18; 101 is a rod on which the pinion is mounted; 102—102 are bearings in which the rod is mounted; 103 is a wheel to turn the rod 101; 104 is a flexible means, for instance a chain or rope, to facilitate the turning of the wheel 103; 106 is a conveyor box; 105 is a liquid-tight chute connecting the hopper 10 and the conveyor box 106; 107 is an opening in the bottom of the chute above the lower flight of conveyors; 108 is an inclined bottom to the conveyor box; 109 is a conveyor pan; 110 is a chute on the end of the conveyor pan; 111 is a perforated section at the lowest point of the conveyor pan; 112 is a drain from the bottom of the conveyor box; 113 is a flight conveyor of the scraper type; 114 are perforated flights of the flight conveyor; 115 is a sprocket wheel at the upper end of the conveyor; 116 is a supporting wheel at the midlength of the returning flights; 117 is a sprocket wheel at the lower end of the conveyor; 118 is a sprocket wheel at the bend in the conveyor pan; 119 is a motor mounted on the conveyor box; and 120 are the associated gearing and connections which drive the conveyor. The motor is preferably electric and of variable speed. 121 is another motor mounted on the conveyor box; 122 is a small conveyor driven by the motor 121 for a purpose hereinafter to be described; 123 is a liquid which is shown partially filling the conveyor box and the hopper; 124 is a box opening into the conveyor box; 125 is an overflow pipe within the overflow box 124 but placed outside the wall of the conveyor box. The drive for the first conveyor is shown in Figure 1c in which 119 is a motor mounted on the conveyor box; 120 is a wheel driven from the motor; 126 is a wheel driven from the said first-named wheel by a texrope drive or by a sprocket chain; 127 is a shaft; 128 is a gear wheel on the end of the shaft; 129 is a gear wheel on the shaft 130 connected by a sprocket chain or a similar device; 131 and 132 are sprocket wheels connected by a chain 133; 134 is a shaft mounted in the conveyor box and carrying sprocket wheels 135 over which are trained chains of the flight conveyor. The operation of the drive will be obvious to persons skilled in the art. 140 is a screen to arrest the flow of floating impurities and 150 is a water inlet. 151 is a screen before box 124.

Figures 1d and 1e show features of the conveyor pans. 136 shows the conveyor pans cut on the diagonal whereby to avoid interference of joints and flights; 137 show that the leading edges of the conveyor pans are depressed so that the approaching flights will ride smoothly from one pan to the next; and slots 141 in the pan ends half encircle the pins 142 of supports 143, the pans being held down by the washers 144 on the pins.

The apparatus 1 of the invention functions as follows: Through the chute 11 the materials to be separated are discharged into the hopper 10. The inclined bottom and sides of the hopper direct the materials toward the chute 105. Before reaching the chute, however, the materials strike the liquid 123 and the splash is absorbed within the hopper. The gate 16 is opened by turning the wheel 103, which turns the pinion 100 which, being in mesh with the rack 18, lifts the door 16. The material passes down the chute 105 and through the opening 107 into the conveyor pan. The flights of the conveyor gather the material and push it up the pan to discharge chute 110. The flights of the conveyor are preferably perforated in order to permit a portion of the liquid which is carried along with the coal to return to the conveyor box. The liquid level in the apparatus is maintained by means of the overflow pipe 125. The overflow from the box may either be run to the sewer or to an apparatus for recovering the active constituent of the liquid. The perforations 111 in the bottom of the conveyor pan give egress to the fine solid particles which would otherwise collect at that point. The solids thus collected can be removed, together with a certain amount of liquid, from time to time or continuously as the operator sees fit. The apparatus described is one means of carrying out the pre-treating of the material with a solution of a film stabilizer.

2 refers generally to the second step of the process and to the apparatus which is used in the preferred embodiment to carry out that step. 21 is a shaker screen of a type perforated throughout a considerable extent of its length; 20 is the receiving end of the shaker screen which is positioned beneath the discharge trough 110 of the conveyor which has just been described; 22 are the sides of the conveyor, which are preferably protected by wood strips 23 to lessen the abrasive effect of the traveling material, and if the material is coal, to lessen the abrasive effect on the coal; 24—24 are spring boards bolted at their upper ends to beams 25—25 and at their lower ends to angle members 26; 27 is the discharge trough of the conveyor; 28 are angle irons which, together with the angular side pieces 22, form the frame of the shaker screen. The perforated portion of the shaker screen may be made of a perforated plate, a screen of the wedge-wire or other type, or in any other suitable way. 29—29 are spring boards; 200 is a tray carried by the spring boards 29; 201—201 are channel-shaped iron sides of the tray; 202 is the bottom of the tray which is attached by bolts or other suitable means to the channel sides; 203 are the means which bind the spring boards to the tray; 204 are weights placed in the tray; 205—205 are resilient driving rods, 206—206 are the connections between said driving rods and the screen 21 and the tray 200 respectively; 207—207 is a shaft mounted in the bearings 208 on the support 209; 210 is a motor of variable speed; 211 is a wheel keyed to the shaft 207; 212 is a means, such as a rope drive, to drive the wheel 211 and shaft 207 from the motor 210; 213—213 are eccentrics keyed to the shaft 207; 214—214 are eccentrics placed oppositely to eccentrics 213 and keyed to the shaft 207; 215—215 are means connecting the driving rods 205 to the oppositely placed eccentrics, it being observed that the screen is driven by one pair of eccentrics and the tray is driven by the oppositely placed eccentrics; 216 is a spray pipe with nozzles 217 placed above and crosswise of the shaker screen; 220 is a collecting trough placed beneath the foraminous part of the shaker screen; 221 is a pipe which drains the said trough; 222 is a separating cone, the construction of which is as follows:

222 is a cone-shaped tank whose sides are at an angle down which solids will fall; 223 is a circular weir at the top of the cone over which liquid may flow to the channel formed by the weir and the side of the cone; 224 is an outlet and mixing box formed by the channel and a box-like projection on the side of the cone; 225 is a valve in a short pipe at the bottom of the cone; 226 is a silt chamber; 227 is a pipe and valve at the bottom of the silt chamber; 228 is a water line leading to the silt chamber; 229 is a valve in the water line; 230 is a pipe line leading from the top of the silt chamber to the interior of the cone; 231 is a water supply pipe line; 232—233 are branches thereof; 234 is a valve in one said branch; 235 is a valve in the other said branch; 236 is a valve leading in from the said water supply to the other side of the silt cone; 237 is the discharge pipe to the end of which supply line 232 is connected; supply lines 235 and 236 are connected to the base of the silt removal cone; 240 is a tank; 241 is a pipe line leading from the tank to the box 224; 242 is a valve in the said pipe line; and 243 is a pipe line leading to the said hopper 10.

The functioning of the second section of the apparatus is as follows: The material, for instance coal, is discharged from the chute 110 onto the receiving end 20 of the conveyor 21. The conveyor is the shaker type which is reciprocated by the driving rods and has its weight counterbalanced by the swinging tray which is also moved by driving rods from the oppositely placed eccentrics. The tray is loaded so that vibration is reduced to the minimum. The shaker screen is hung at an angle such that the coal moves gradually from the receiving to the discharge end of the screen, being spread uniformly over the surface thereof by the reciprocating motion. As the coal and its admixed impurities pass beneath the pipe 216, they are sprayed with water or other satisfactory liquid issuing from the nozzles 217. After it is sprayed, the coal is discharged at 27 into the chute 328. The liquid which was used to spray the coal passes through the screen and into the collecting trough 220, from which it is carried by the pipe 221 to the separating cone 222. The liquid thus transmitted contains a considerable quantity of fine solids and some film stabilizer. The cone is prepared for operation by closing the valve 227, opening the valve 225 and filling the cone to weir level with water. The discharge from pipe 221 is received in the cone, causing water to overflow the weir. The fine solids in the water pass downwardly through the water or along the sides of the cone through the pipe and valve 225 into the silt chamber 226, displacing the water therein. The liquid is displaced toward the top of the cone in a clear condition, flows over the weir, passes to the weir box 224, and has its concentration of film stabilizer raised by addition from the tank 240 through the valve 242 and pipe line 241 to that concentration which produces optimum results. From the weir box 224 the liquid passes through pipe 242 to feed hopper 10. If at any time the addition of liquid through the feed hopper 10 raises the liquid level in the conveyor, the overflow is cared for by box 124 and pipe 125. When the silt cone 226 has been filled with silt, the valve 225 is closed, the valve 227 is opened and water is forced under pressure through lines 233 and valves 235 and 236 into the silt chamber, blowing the silt, together with its admixed liquids, through valve 27 and pipe 237 to a refuse pit or a means for recovering any valuable ingredient that may have been entrapped. When the chamber 226 is emptied, the water is turned off through valves 235 and 236, valve 227 is closed and valve 229 is opened. Clean water flows through pipe 228 and valve 229 and into the silt chamber until the silt chamber is filled, which is indicated by an overflow of water through pipe 230 into the top of the cone. The valve 229 is then closed and the valve 225 opened. The silt in the cone then begins a gradual descent into the chamber 226, violent or splashing descent of water from the silt cone being thus avoided. If the pipe line 237 is clogged by silt, it can be blown out by water through pipe line 232 and valve 234.

In Figures 3 to 3*l* is illustrated the separating chamber. Referring to the numerals, 3 is an enclosed tank; 31 are channel-shaped edges to openings in the top of the tank; 32 are covers for the said openings; 33 are flanges on the said covers of size to fit within the said channel-shaped edges of the openings; 34 is a liquid which partially fills each said channel-shaped opening forming a hermetical seal; 35 is a vent pipe; 3: is a motor support mounted on the said tank; 38 is a motor of variable speed; 39 is a speed reducing gear of customary construction comprising a chain of large and small driving and driven wheels; 300 is a shaft running crosswise of and projecting somewhat beyond the sides of the tank; 301 and 302 are sprocket wheels keyed to the shaft 300 at opposite ends thereof; 303—304 are chains on opposite sides of the tank driven from the said sprocket wheels respectively; 305—306 are sprocket wheels mounted on the ends of shafts 307 and 308 respectively, said shafts passing through the wall of the said tank; 309—309 are stuffing boxes which can be filled with grease from the outside of the tank through the fittings 310; 312 are sprocket wheels keyed to the shaft 308; 313 are wheels mounted on shafts 314 which are journaled within the tank; 315 is a wedge-operated take-up mechanism whereby one roller 313 can be moved longitudinally of the machine to take up the slack in the chain. One take-up means is placed at each end of the roller. 316 is a screw for operating the wedge and moving the roller; 317—317 are conveyor chains; 318 is a flight of a conveyor which is mounted on the conveyor chains 317; 319 are perforations in the flights of the conveyor; 320 is a conveyor pan bent at the point 321 and having a discharge lip and chute 322; 323 is a wedge-wire screen forming the bottom of the upper portion of the conveyor pan; 324 is a section of the tank wall spaced considerably away from the said screen to permit liquid to make its way through the said screen and to be collected in the said portion of the tank; 325 is a channel leading from the portion 324 past the outside of the tank and connecting with the interior of the tank at 326; 327 are blow-out connections to permit the forcing of a stream of water or other liquid into the tank at that point; 328 is a chute projecting through the side of the tank; 329 are dividing walls in the chute; 330 is the back plate of a hopper; 331 are perforations in the back part of the hopper; 332 is a portion of the hopper back plate which is inclined diagonally forward and which contains the perforations 331; 3320—3320 are perforated portions of the said back plate of the hopper which are continued beyond the side plates thereof; 333—334 are side walls of the said hopper, both being inclined inwardly to the degree necessary to constrain any material entering through the chute 328 and passing to the bottom of the tank to fall within the conveyor pan; 335 is the front wall of the said chute which is constructed, in the form of the invention shown in Figure 3, as one piece of the front conveyor pan; 336 is a section of the said wall inclined diagonally toward the receiving end, and 337 is a portion of the said wall inclined toward the discharge end whereby to present the wedge face toward the charging end; 338 is a conveyor pan; 339 is a wedge-wire screen forming the bottom of the upper portion thereof; 340 is a discharge chute attached to or forming a part of the said conveyor pan; 341—341 are sprocket wheels on the shaft 307 over which are trained the chains 342—342 of a flight conveyor 343; 344 is a bend in the said flight conveyor pan; 345 is a shaft carrying two sprocket wheels at the said bend; 346 is an extension of the conveyor pan beyond the sprocket wheels 345 and being continued downwardly to form the wedge; 347 are means for adjusting the position of the sprocket wheels 348 which are mounted on a trunnion to carry scraper flight conveyor 343; 349 is a pan extending from side to side of the machine to catch the drip which passes through the wedge-wire screen 339 and return it to the liquid in the tank; 350 is a drain at the rear and lowest point of the tank, whose bottom is preferably inclined; 351 is a chamber beneath the said screen; 352 are a pipe and valve to permit the drawing off of the sludge which may collect and pass through the said screen, the said sludge being passed through the said pipe to the settling tank to be hereinafter described, the continuation of the said pipe not being shown; 353 is a chamber attached to the wall of the tank; 354 is a screw operating in a nut 355 fastened to the tank; 356 is a stuffing box through which the said screw passes; 357 is a cylinder attached to the said screw; 358 is a pipe projecting within the box 353 and within the cylinder 357 having therewith a movable fit made liquid-tight by machining or by the use of a satisfactory sealing material; 359 is a valved pipe leading to the box 353; 360 are openings below the parting liquid level connecting tank 3 and weir box 353; 3601 is an opening connecting weir box and tank above the water level; 361 is an enclosed weir box on the side of the machine; 362 is a pipe weir within the box to control the water level. The pipe 362 is connected to the settling tank. 363 is a pipe leading at 364 and 365 into the tank; 366 is a hollow gauge within the pipe 363 and projecting thereabove. Shaft 366 of the said gauge is preferably calibrated on its outside and its hollowness is used for the insertion or withdrawal of shot or other heavy material to its interior so that it can be standardized against the specific gravity of the parting liquid in the apparatus to record correctly its level; 367—368 are oppositely placed hollow projections on the sides of the apparatus; 369—370 are removable covers held on by bolts or other satisfactory means not shown to hermetically seal those of the said openings which are not in use; 371—371 are flanges on the said projections designed to abut against and form a hermetical seal with similarly placed flanges or similarly projecting members of that apparatus 4 which accomplishes the next step in the process; 3280 is a manifold forming a part of the chute connected to a suction apparatus not shown and through openings 3281 to the chute whereby any escaping gases may be caught; 372 indicates the framework which supports the tank; the line 373 indicates the upper level of the liquids in the tank; the line 374 indicates the interface of the separating liquid and the light liquid; 375 is a pipe opening into the tank whose purpose will be hereinafter described; 377—377 are angle bars supported either from the members 332 and 337 or from the sides of the tank by bars which cover the conveyor chains and prevent them from being damaged by the descending slate; 379 is a screen extending preferably the full depth of the liquid to prevent light materials from being washed back into the path of the outer conveyor. The screen stretches from wall to wall of the tank between the chute and the outer conveyor and from a point slightly above the level of the liquid to a point just short of the lower conveyor.

This apparatus is operated to accomplish the third step of the process as follows: The valve of pipe 359 is opened and heavy liquid is admitted to the tank through openings 360 until the level 374 is indicated on the slight gauge 366. Water is then run into the tank through the orifices 375 until the level 373 is reached. A continuous flow of water may be maintained through the machine through the pipe 375 and the overflow 362, if it is desired, or water may be added intermittently and as needed. The height of the parting liquid in the tank is regulated by the overflow 357. As the liquid is admitted it rises in the tank and in the box 353 until it reaches the open top of the cylinder 357 at which point it flows downwardly through the said overflow and through the valve and pipe 358 to the used liquid tank. The valve in the said pipe 358 may be kept open and a continuous flow of liquid pass into the chamber through pipe 359 and out of it through pipe 358, or the operation may be made intermittent, control being kept by observation of the sight gauge.

The tank having been filled to the proper level with liquid, coal is passed through the second step of the process hereinbefore described and is dropped from the conveyor into the chute 328, passing in four streams down the divisions 329 by which it is distributed across the width of the tank. The chute 328 may be placed on either side of the machine as is indicated in Figure 3e, an opening on either side being provided, that not in use being closed by a plate 376. The apparatus is started; the motors drive the two conveyors either at the same or at different speeds depending to some extent upon the quantity of material each has to handle. The coal, slate, and other admixed impurities drop into the water layer while still in the chute so that they are dispersed by the water before reaching the parting liquid; the splash made by their falling is dissipated and entrained gas is removed before they leave the chute. Passing through the water layer they enter the parting liquid, whose density has been selected to be between that of coal and that of slate. The coal floats on the surface of the parting liquid, the slate sinks down guided by the hopper 334 and, entering the conveyor pan, is picked up by the scraper conveyor blades and carried toward the discharge. The coal floating at the interface of the liquids is picked up by the conveyor 343 and carried toward and onto the conveyor pan 346. The specific gravity of the liquid is preferably chosen to be only slightly lower than that of the middlings. The middlings are those portions of the mixture which contain in one lump both slate and coal. The middlings tend to sink only slowly in the liquid whereas the slate sinks instantly and the coal floats.

Each of the conveyors acts as a pump, the effect of which can be varied by the use of scraper blades of either solid or foraminous cross section, the number of openings in the said scraper blades being variable to secure pumping actions of different intensity. As the outer conveyor sweeps sunken material along its conveyor pan and up the incline toward the discharge, some of the entrained liquid tends to fall back through the orifices in the flights, and most of that which remains is sucked out of the material as it is pushed over the wedge-wire screen 323. The slate is discharged through the hopper 322 into the trough 41 which forms a part of the apparatus 4 to be hereinafter described. The lower plate of the conveyor pan of the inner conveyor 338 is carried well beyond the pinion 345 and is then bent inwardly as indicated at 346a so that the floated material will be swept on without jamming between the flights and the pan. By carrying the conveyor pan beyond the sprocket wheels 345 the chain is enabled to bend upwardly, and enough slack is provided therein so that, when coal tends to jam the conveyor by taking up slack, it may jump and release it without damage. The conveyor flights then sweep the coal up the inclined pan, over the wedge-wire draining screen 339, and eject it through the hopper 340 onto the trough 42 which forms a portion of the apparatus 4 to be hereinafter described. The liquid which is driven by the outer conveyor passes through the wedge-wire screen 323 downward through the chamber 324, outside the main wall of the tank through the passage 325 and the opening 326 into the chamber which is formed in back of the partition 336—337. The liquid which is entrained by the inner conveyor is swept up the inclined conveyor pan, passes through the wedge-wire screen 339, flows down the drain board 349, and is carried back to the chamber behind the partition 336—337. Sides 333—334 of the trough, together with the sides of the tank, form tubes 380—381 through which liquid from channel 325 and the chamber beyond 336—337 may travel to the receiving end of the machine, entering again into the separating chamber through the orifices 331 of the plate 330. There is thus maintained a constant motion of separating fluid and its superimposed sealing liquid from the receiving toward the discharge end of the machine. The length of the separating chamber, namely the distance between the plate 330 and the wedge 336—337 is such that the pieces of coal will have risen to the top of the separating liquid and the pieces of slate will have dropped to the bottom before the wedge has been reached, but the middlings, due to the selection of a parting liquid of only slightly lighter specific gravity, will be held in suspension, slowly sinking. The middlings rich in coal sink at a slower rate than the middlings poor in coal, due to their different densities, and a classification of the middlings takes place before the wedge is reached. The wedge then directs the richer middlings upward into the coal and the coal-poor middlings downward into the slate.

In Figures 3b and 3c is shown a means of varying the proportion of middlings which is thrown into the coal and a means which materially contributes to the production of coal with a standard ash content. In those figures 346 is the bottom of the conveyor pan; 383 is a plate; 382 is a hinge connecting the plate to the lip of the conveyor pan; 385 is a plate and 386 is a hinge connecting the plate 385 to plate 383; 387 are hook-shaped members which underlap the edges of the channel irons 377 for sliding movement. On the plate 383 at a point near the hinge 386 there is connected a lifting rod or cable 387 which extends upwardly between the conveyors and the wall of the tank and through a water seal box 388 mounted in the side of the tank to a point on the outside from which it may be manipulated. 389 are rods. By pulling up on one said rod the plate 383 will be lifted, and the plate 385 will swing toward the receiving end of the machine, the edge 386 of the wedge will have been raised and a greater proportion of the middlings will have been directed into the slate, producing a coal of decreased ash content. If, on the other hand, a coal of increased ash content is desired, a second rod attached at the lower end of plate 385 and projecting through the wall of the tank in the same manner may be manipulated to draw the plate 385 rearwardly and lower the angle 386. As shown in Figure 3h enough room exists between the edge of the conveyor flights and the wall of the tank to permit the passage of a rod, and by stationing and sealing tank 388 entirely outside of the wall 3 no interference between the conveyor and the rods will be experienced. The lower end of the rod may be attached to the wedge by a cable, as shown.

In Figures 3k and 3l is shown another means of adjusting the wedge. In those figures 3 refers to the tank; 390—390 are elongated boxes on the outsides thereof (a corner of which is shown in dotted lines in Figure 3); 391 are slots connecting the interior of the tank with the said boxes; 392—392 are links attached to the lower corners of the wedge; 393—393 are pins attached to the links, passing through the slots 391 and mounted in movable blocks 394; 395—395 are rods attached to the said blocks bored and screw-threaded; 396—396 are revoluble screws mounted in bearings attached to the sides of the boxes bearing at their heads pinions which mesh with pinions on shaft 398 which is mounted in the sides of the tank and projects through the wall of the box and a stuffing box 397; 399 is a hand wheel to turn the rod.

The operation of this apparatus is as follows: The hand wheel 399 is turned, rotating the intermeshed pinions and the rods 396 which extend or restrict the blocks 394 by reason of their screw fit with the interior of portions 395. As the blocks 394 are moved along the boxes, they push the link 392, which being attached to the corners of the wedge 385 move the wedge as indicated in part by the dotted lines of Figure 3k.

A brief description of the apparatus is as follows: The material to be separated enters through the chute into the receiving end of the apparatus and is collected by the hopper which encircles the section of the apparatus in which the actual parting of mineral and gangue takes place. The pumping action of the conveyors keeps the liquid in continuous circulation from the receiving end of the parting chamber to the discharge end thereof. The upper conveyor sweeps the floats onto the conveyor pan, and the looseness of the conveyor chains permits the conveyor flights to jump and free themselves from any particles which tend to jam against the lip of the conveyor pan. The lower flight gathers the sinks and carries them out of the separating chamber. The middlings are carried by the current toward the wedge which forms the discharge end of the separating chamber and are divided according to the proportion of slate and coal they contain, those heavy because of large quantities of slate being thrown into the refuse, and those light because of usable quantities of coal being gathered in the floats. The separated materials are pushed by their respective conveyors over wedge-wire screens, or other suitable draining mechanism, which remove the majority of entrained liquids, and the materials themselves are discharged by the conveyors onto the collecting pans or troughs of the screen to be hereinafter described. The parting liquid which passes through the wedgewire screens is returned along the sides of the machine and outside the separating chamber to the charging end of the machine and a continuous circulation is thus maintained. The level of heavy liquid is maintained at any desired point by the adjustable, sealed weir at the end of the machine and the level of sealing fluid is maintained by the weir box on the side of the machine. Continuous addition and removal of liquid through the machine is thus possible, as well as intermittent additions as additions become necessary. Means are provided for blowing out the space beneath the conveyor pans, and means are also provided for the removal of sludge from the bottom of the tank. If a prewetting step is used on materials of ¼" size or less the efficiency of the separating apparatus is reduced by rafting.

After the coal has been separated from the indigenous impurities, both are subjected to a vigorous scrubbing. In order to prevent the loss of any liquid by evaporation or otherwise the scrubbing is preferably carried out in a hermetically sealed chamber. A shaker screen is used in order to make possible the thorough washing of the coal, and the problem of transmitting power to the screen without opening the apparatus to the air was no small one. It was accomplished, however, by the means which are more fully described below. Briefly stated, the coal is carried through a hermetically sealed connection from the separating apparatus into the washing section where, constantly tumbled about by a shaker screen, it is subjected to an extremely vigorous washing whereby to remove all fine particles and substantially all the liquids that have been used in the process. The coal and slate are then dropped from the screen into the water baths of water sealed conveyors. The used liquid is run over a concentrating table, which tends to precipitate suspended solids, and to form larger aggregates of suspended liquids, and the whole runs to the tank which forms the bottom of the machine, where a weir divides the liquids which contain only light suspended solids from the heavy sludge. The divisions are respectively drawn off and treated in a recovery system which will be more completely hereinafter described.

In the drawings Figures 4 to 4e are illustrative of this portion of the invention. In the figures, 4 refers generally to the washing apparatus; 40 is a shaker screen; 41 is a coal trough forming part of the said screen; 42 is a slate trough forming part of the said screen; 43 is a partition dividing the screen into two sections longitudinally whereby to keep the separated coal and slate from becoming intermingled. 44 are strips of wood or some similar material which is capable of withstanding the abrasive action of the coal and slate; 45 is a foraminous section at the charging end of the screen which permits the draining of liquid; 46 is a wedge-wire screen which forms the floor of that section of the screen which approaches the discharge end; 47 is a solid bottom to the screen at the discharge; 48 are discharge lips.

The construction of the screen is as follows: Angle irons 49 form the side frames of the screen and extend longitudinally from the feeding troughs to the discharge plate 47. Dividing member 43 is also an angle iron extending from the troughs to the pipe; 400 are angle members connecting the side frames of the machine to the main frame of the screen; 401—401 are J-shaped members having the taller leg of the J of considerable height; 402—402 are braces connecting the frame member 43 with the lower portions of the J-shaped member; 403 is a brace directly connecting the two J-shaped members; 404 is a splash guard running the length of the foraminous portion of the screen.

405—405 represent the support for the entire washing section; 406 is a tank forming the base of the machine; 407 is one wall of the tank; 408—408 are angle-shaped members forming channels with 407 and 416 respectively running lengthwise of and within the wall 407 and 416; 409 is the inclined bottom of the tank; 410 is a wall of the tank running lengthwise of the apparatus and forming a weir which divides the tank into two sections; 411 is the bottom of the tank beyond the weir; 412 is the outer wall of the tank, in this case placed considerably beyond the outer wall of the screen section; 413 is the top of the said extended side; 414 is a rectangular opening, channel-shaped in cross-section, forming a seat for cover 415. By filling the channel-shaped member partly with water an effective gas seal is created. 416 is a wall forming in part the outer wall of the apparatus and in part a wall dividing the two compartments of the tank; 417 are braces attached on the inside to channels 408; 418 is a bar supported by braces 417; 419 are side plates extending lengthwise one on each side of the apparatus; 421 are side plates attached to the braces 402—403 running lengthwise on each side of the apparatus and overlapping the upright portions of channel members 408 inwardly thereof; 420 are drain guards attached to members 419 to prevent the drainage from the screen from running into the channels 408; 422 are drain guards attached to the walls of the screen chamber and projecting within the channels formed at the edges of the screen by angle members 49 and J-shaped members 401—401; 423—423 are walls of the screen section of the apparatus; 424 is the top of the apparatus; 425 is a cover for an opening in the top of the apparatus, said cover being formed with one continuous flange 426; 427 are continuous channels in the top of the apparatus of size such that the continuous flange of the top 425 may be seated in the channel which, being partly filled with liquid, forms an effective hermetical seal. 428—428 are supports attached to and projecting at right angles to the outer legs of the J-shaped members; 429—429 are wooden spring boards; 430 are beams to which the spring boards are bolted; 431—431 are spring boards suspended from the beams 430; 432 are weights hung from the said spring boards; 433—433 are guides mounted on the frame 405 of the apparatus; 434—434 are buffer members approaching the counterweights; 435 is a shaft journaled in the frame 405; 436 is a wheel capable of being driven by a belt or similar power-transmitting means and, being keyed to the shaft 435, capable of driving the said shaft; 437—437 are eccentrics; 438—438 are driving rods attached to the eccentrics 437 and attached through connections 439 to the J-shaped screen frames; 440 are eccentrics placed on the shaft opposite to eccentrics 437 and on the outer sides of the frames 405 respectively; 441—441 are driving rods connecting the eccentrics to the counterweights 432. The eccentrics, frame, and driving gear at the discharge end of the machine are shown broken away to indicate that in practice they are farther away from the tank than was permitted to be shown in the drawings. 442—442 are headers which may be suspended from the beams 430 by connections 443 which comprise a band encircling the header having a hook to pierce an eye on a middle strip connected to the beams 430; 444 are pipes connected to the headers entering the washing tank through hermetical seals 445; 446 are valves in the pipes 444; 447 are pressure gauges operatively connected to the pipes 444; 448 are pipes connected horizontally to pipes 444; 449 are spray nozzles affixed to pipes 448 so that the liquid in pipes 448 may be directed at the most efficient angle upon the material on screen 40; 450 are supports attached to the tank at spaced intervals; 451 are baffle plates supported by supports 450 extending transversely of the tank; 452 are channels at the bottom of the baffle to catch the drip and direct it to the sides of the screen into the channels formed by angles 49 and sides 401 of the frame; 453 are a series of supports extending transversely between walls 407—416 of the machine and inclined with respect to the horizontal; 454 is a plate supported on supports 453, extending substantially the full length of the machine, inclined by the inclination of supports 453 and terminating short of wall 416; 455 are supports which also extend between the wall 416 and wall 407 and which have inclination opposite to that of supports 453; 456 is a riffle plate substantially coextensive with the length of the machine and extending from the wall 416 to a line short of the wall 407.

In Figure 4a the screen is broken away at 454 to show the plain incline plate 454; at 456 on the same figure the screen and plate 454 are broken away to show the riffle plate 456 and the diagonal placement of the riffle bars. 457 is an outlet at the bottom of the tank 406 and at the juncture of incline plate 409 and weir 410; 458 is a pipe opening out of the portion of the tank beyond the weir; 459 is a blow-out pipe through which water under pressure can be directed to discharge the sludge from the bottom of the tank through the orifices 457; 460 is a baffle plate at the end of the channel formed by members 49 and 401; 461 is a channel cut through members 49—49 so that any fluid in said channel member may be discharged upon the surface of and pass through a foraminous portion of the screen; 462 is a boot beneath the discharge end 47 of the screen, separated from the tank as shown in Figure 4 and divided at its center by partition 463 which prevents the mingling of coal and slate.

In Figure 4e is shown the placement of the spray nozzles so that a double overlap of spraying water occurs. By this arrangement the plugging or failure of one spray will not affect the washing of the coal because the two adjoining sprays will still overlap.

The operation of the apparatus which has just been described, considered in some detail, is as follows: Coal is discharged from the float conveyor of the separator onto the receiving pan 41 and slate is discharged from the sink conveyor onto the receiving pan 42. The longer leg of the J-shaped screen frames is, from the receiving to the discharge end of the screen, of decreasing height, whereas the shorter leg, that which is attached to the spring boards, is of uniform height. As a consequence, spring boards of uniform length are used and the screen is held on an angle. The screen is divided at its mid-portion by a partition which prevents the separated coal and slate from mingling. The driving mechanism reciprocates the screen at a rate which is consistent with the best performance and the materials are moved gradually from the receiving to the discharge end while being vigorously sprayed by a multitude of showers. The motion of the screen in combination with the sprays turns the coal repeatedly over so that all sides are exposed to, and thoroughly washed with, the cleansing liquid, effectuating removal of the parting liquid according to the efficiency of the film stabilizer used.

The receiving pans 41—42 of the screen are solid, thereafter the screen becomes foraminous either by the punching of holes through the plate, by the use of ordinary screens, or by other means. The final section of the screen is made of wedgewire in order to drain from the coal and refuse substantially all entrained water before delivery to the discharge pans 47 and the divided boot 462. The screen could be all of one type of wire but the arrangement shown produces superior results, all factors considered. Water is preferably used for washing the material and it is forced under pressure into headers 442 from whence it travels through the depending pipes to the spray pipes 448 and through the nozzles 449. The velocity of the spray is such that a considerable portion of the fluid is splashed from the material or the screen. The direction of the sprays would build up air currents passing from the receiving to the discharge end of the apparatus and considerable quantities of spray, containing recoverable liquid, would pass over the screen and down into the divided boot where it would be lost and contaminate the coal. To prevent this, baffle plates 451 are attached before each spray pipe so that the mist from the preceding spray will be caught upon the face of the baffle, run down into channel 451, and be emptied into the channels formed by the members 49 and 401 of the screen from whence they will pass toward the discharge end and be issued through orifices 461 upon the wedge-wire screen. Substantially all liquids which are brought into the apparatus with the coal are removed from the coal and passed through the screens. In addition there is removed by the sprays a considerable quantity of fine solid particles, consisting mainly of earth and finely divided particles of coal and slate, all below a certain size passing through the screens with the wash liquid.

When the liquids with entrained solids pass through the screens, they are prevented from reaching the sides of the tank by baffles 404, plates 419, 420, 421, and 408. It will be observed that plates 419, which are rigid with the frame of the machine, have openings through which pass the bars 403—402 of the screen, the openings in the wall of plate 419 being of size to permit the reciprocating motion of the screen. To prevent the discharge of liquid through that opening into the seal the plates 421, of a size adequate to cover the said openings in all positions of the screen, are mounted on the rods 402—403 and a baffle plate 420 deflects any fluid flowing down the side of plate 419 over and beyond the said plate 421. All liquid which passes through the screen, consequently, falls upon and runs down the inclination of plate 454, which is a plate having a surface which permits the maximum desirable transportation of the liquid. The plate 454 is terminated short of the side wall and the liquids drop therefrom at substantially the top of riffle plate 456. They run down the said riffle plate, the solids tend to precipitate, and globules of heavy liquid tend to become larger globules so that, when the liquids have finally passed the length of the riffle plate, a partial separation of the constituents has been effected. The riffle plate is terminated short of the side wall 407 of the machine and the flow passes over the ends thereof and into the tank 406, all of whose bottom portions slope to the central low point in the neighborhood of outlet 459. The sludge and some parting liquid settle in the vicinity of the opening 457 and the liquid which carries only comparatively fine particles of solid flows over the weir 41 into the other section of the tank, being pumped through orifice 458 to the second settling tank, as is more fully elsewhere herein described. The sludge is pumped through orifice 457 to the third settling tank, which is elsewhere herein more fully described. If the sludge has collected so thickly at the orifice 457 that the sludge pumps cannot draw it from the tank, a hose may be attached to pipe 459 and water under pressure used to force the sludge out of the chamber.

The screen is counterbalanced by the use of spring board supported counterweights driven by oppositely placed eccentrics from the same shaft. The covers which give admittance to the tank are water sealed by the use of flanged covers which fit water filled channel members in the machine casing.

In order to drive the screen, which is inside the tank, from the driving gear, which is outside, without permitting the escape of vapors, channel members partially filled with water are provided on each side of the machine. The screen frame is made J-shaped each J projecting into the liquid within the said channels, and being shorter than they by the length of the swing. The upper portion of the tank is then, so to speak, placed within the hook of the J so that its lower edge is beneath the water level in the channel. The J-shaped frame, consequently, reciprocates within a water seal which effectively prevents the escape of gas, and the previously described construction of the apparatus prevents the contamination of the liquid in the said channels.

From the screen the coal and slate drop into divided boot 462. Giving admittance to this boot are hermetically sealed covers 464. Hermetically attached to the boot on the one side is liquid-tight conveyor box 51 and on the other side a similar conveyor box 52. The boot thus becomes two chutes, one for the coal and one for the slate. A description of one of these conveyors will suffice for both. 51 is the conveyor box in general, being a gas and liquid-tight tank made of metal or other suitable material; 53 is a hopper within the said conveyor tank having an inclined wall 54 to direct the material which falls from the screen into the conveyor box at the angle which offers the least interference with the descending flights of the conveyor; 510 is the inclined underside of the conveyor tank; 511 is a displaced portion of the said side; 512 is a foraminous section forming a continuation of the portion of the bottom 510, the portions 511 and 512 forming between them a space of a capacity adequate to take care of such liquid as may be discharged to them from the solids which are carried out of the tank by the flights. 505 is a conveyor pan; 506 are openings in the lower portion of the conveyor pan; 507 is a section of wedge-wire screen forming the bottom of the said conveyor pan at a point just short of the discharge lip thereof; 58 is the discharge lip of the conveyor pan over which the material is pushed by the conveyor; 59 is the supporting underlip of the conveyor tank; 513 is a flight conveyor; 514 are sprocket wheels over which the conveyor chains are trained; 516 is a motor mounted on the frame 517 of the conveyor; 518—519—520—521—522—523 are a combined power transmitting and speed reducing agency consisting, in the modification shown, of a series of alternate large and small gears connected either directly or by means of flexible driving means such as chains or ropes. 524 is a wheel driven by means 523 and keyed to shaft 525 on which are keyed the sprocket wheels 514; 526 are bearings on the tank which support the rod 525; 527 are parallel bearing blocks; 529 is a shaft journaled at one end with a loose fit in the said bearing blocks 527 and at its other end in complementary bearing blocks not shown, at the other side of the conveyor box. 530 is a rod fastened at one end to the shaft 529 and having at its upper end a screw-threaded nut 532; 531 is a screw-threaded rod making operable screw-threaded contact with the nut 532. One of these rods is attached to each end of the shaft 529. The rods 531 are mounted on a rod which transverses and is attached to the sides of the tank. The conveyor may jump away from the pan due to the loose fit of the blocks and may be manually adjusted by nuts 532. 541 is an opening in the base of the section 511 to which is attached a pipe, not shown, connected to the lower section of the conveyor whereby to return the liquid drained from the whole by the wedge-wire screen to the conveyor box at a lower point; 542 is an inlet pipe and valve through which liquid can be run into the conveyor box; 543 is an outlet pipe and valve at the bottom of the conveyor which permit the drawing off of such sludge as may form there. The pipe 543 is connected either to a waste pit or to the settling tank, which is elsewhere herein more fully described. 544 is a liquid box outside of the machine, 545 is an overflow pipe within the said liquid box.

The operation of the apparatus is as follows: Coal is dropped from the discharge lip 48 of the screen through the divided boot and the hopper. The hopper and the conveyor tank are filled to the level 546 with water or other suitable liquid. The coal is discharged into the water therefor above the hopper level and is directed by the inclination of the chute 54 to a place in proximity to the descending flights of the flight conveyor. The coal passes through those flights and directly to the conveyor pan where it is picked up by the ascending flights, drained of liquid by passage over the wedge-wire screens and discharged over the discharge lip 58. The liquid level in the apparatus is kept at the level 546 so that no fumes or liquids coming over the discharge end of the screen will be able to escape into the air. The liquid which is drained through the wedge-wire screen fills up the space between the conveyor pan and the tank and thereafter passes through the screen 512 into the space below from which it is drained off by pipe 541 which returns it to the bottom of the conveyor tank or elsewhere. Means are provided, not shown in these drawings, for blowing out the space between the conveyor pan and the bottom of the tank and consist of a nozzle through which water can be forced under pressure at 459 as has hereinbefore been described for other apparatus.

The liquids which wash the coal in the washing section remove from the coal and slate substantially all the heavy liquid and the fine particles which are produced by abrasion or which are carried through the machine. In the settling tank at the bottom of the washing apparatus the liquid with fine suspensoidal matter is separated from the heavy sludge by the weir. The heavy sludge is pumped from the bottom of the tank through pipe 457 to settling tank 7, shown in Figures 7 to 7c, and the liquid with light suspensoidal matter is carried through pipe 458 to the main settling tank 6, shown in Figures 6 to 6c.

The system contains three settling or separating tanks interconnected, of which the first, located in the base of the washing section, makes a preliminary division between sludge and liquid containing light suspensoidal matter, the second, called for purposes of differentiation the main settling tank, separates the comparatively light suspensoidal matter from the washing liquid and the third, called for convenience the sludge trap, receives the sludge from both the first and second tanks. The statement has frequently been made in the art that it is impossible to separate coal of fine size from washing liquid by any static method. It is believed that the method herein described for accomplishing this result is the only one which has ever been successful.

In Figures 6 to 6c, which illustrate the so-called main settling tank or separator, 6 indicates the separating apparatus as a whole; 458 is the discharge end of the pipe which carries the liquid with light suspensoidal matter from the primary settling tank; 61 is the top of the tank; 610 is a tubular member which passes through and fits an opening in the top 61; 611 is an angle iron which joins the tube 610 to the top 61 with a hermetical joint. Joining may be by welding or other suitable hermetical sealing. The tubular member extends toward the bottom of the tank. 612 are openings in the sides of the tubular member above the operating water line; 613 is a cover to the tubular member 610 pierced by the discharge pipe 458; 62 is a truncated conical bottom to the tank; 621 is a sump connected to the truncation of the cone. This sump may be considered to be made by passing a plane diagonally through a cylinder. 622 is the diagonal plane dividing the "cylinder" 621 and forming a diagonal bottom on the sump which directs the solids which collect toward the discharge pipe 620 and valve 623; 624 is a pipe carrying water under pressure for use in dislodging sludge from the bottom of the sump 621 if and when the said sludge becomes too solid to be moved by pumps; 625 is a rod journaled in bearing 626 in plate 622 and passing through stuffing box 614 in cover 613; 616 is a handle attached to the upper end of the rod 625; 626 are arms attached toward the bottom of the rod 625 so as to be rotatable by and with the handle 616 and rod 625; 627 are scrapers diagonally placed on the arms 626 so that their movement will dislodge collected sludge from the conical bottom 62 and push it toward the sump 621; 617 are water seal covers whose construction is similar to the water seal covers which have been elsewhere herein described; 630 is an angle member of depth which increases from one side of the tank to the other, welded or otherwise connected to the inside of the tank 6 toward the top thereof; 631 is a wooden weir strip of circular form attached to the angle member 630; 633 is a discharge box at the lowest point of the channel formed by tank 6 and angle member 630; 615 is a pipe connected to the said box 633; 640 is a circular channel suspended from the top 61 of the tank within the weir and having a lip 641 which is slightly lower than the top of the weir 631; 642 are pipes projecting inwardly from the channel 640 toward the bottom of the tank; 65 are supports for the tank comprising metal legs attached to the tank and supported upon the box.

The operation of this apparatus is as follows: The liquid containing light suspensoidal matter in greater or less quantities enters the tank through pipe 458 and tube 610. It passes outwardly beneath tube 610 tending to throw toward the bottom the heavier suspensoidal matter and to rise toward the surface, whose level is established by the weir 631. The vibrations caused by the plunge of the water from the pipe 458 into the body of water in the tank are largely spent within the tube so that the liquid within the remainder of the tank is comparatively quiet. The channel which is formed between the weir and the shell of the tank is sloped and increased in size toward the outlet. The liquid which flows over the weir follows the slope downwardly to the box 633 and is carried by the pipe 615 back into the headers 442 where it is used again for the washing of the solid materials on the screen. Light scum tends to float on the surface of the liquid within the tank and the direction of the liquid currents within the tank would in the normal course wash this scum over the weir. The openings 612 are vents to relieve interior pressure. Interposed between the weir and the pipe is the scum gutter 640. As the scum, floating on the surface of the water and being drawn by the current toward the weir, floats over the edge 641 of the scum gutter, which is slightly lower than the weir and contacts the side of the scum gutter, the scum tends to precipitate therein. As it is precipitated, its apparent specific gravity increases to the point where it will follow the tubes 642 downwardly into the lower section of the tank where it will settle on the bottom and be drawn off with the sludge. The sludge which concentrates in the bottom is from time to time scraped toward the sump and pumped through valves 623 and pipe 620 to the sludge trap. If the pipe becomes blocked it can be cleared by an injection of water through pipe 624.

In Figures 7 to 7c is shown the arrangement of the sludge trap and the still. The function of the sludge trap is to separate out the water with light suspensoidal matter and return it to the main settling tank for further treatment; secondly to separate out isolated heavy liquid and return it to the heavy liquid storage tank; and thirdly to inject all remaining liquids and solids into a still for the recovery of any parting liquid which may be therein contained.

In those figures, 457 and 620 indicate pipes leading from the first and main settling tanks, respectively. 7 refers to the sludge trap taken as a whole; 71 is the pipe through which passes the sludge from pipes 457 and 620; 710 is a sight glass held in liquid and gas tight relationship between plates 711 and 712; 713 is an inlet pipe of diameter considerably greater than that of 71 in order that the discharge material may be reduced in velocity and find easy entrance to the sludge trap and not fill up the sight glass 710; 714 is a tubular member inside the tank through which the material is discharged; 715 is a water seal covering of the type which has been hereinbefore described; 716 is a circular weir within the tank toward the top thereof which forms with the walls of the tank a channel having an inclination sufficient to drain such liquids as pass over the weir to the discharge box 717; 718 is a circular baffle plate within the weir. The lower edge of the baffle plate is beneath the liquid level in the apparatus, and in close proximity to the weir so as to form a substantially complete vapor seal. 719 are a series of valved openings leading into the tank at various levels; 720 is a header connecting the said valved openings; 721 is a draw-off pipe leading from the header; 722 is a glass peep slot though which the contents of the tank may be observed substantially through-out its height; 723 is a pipe mounted in the side of the tank; 724 is a section at right-angles thereto; 725 is a liquid-tight ball joint; 726 is a section of pipe movably connected to section 724 through elbow 727 and ball-joint 725; 728 is a block attached by rod 729 to pipe 726 and through connection 730 to rod 731 which passes through a stuffing box in the top of the tank; rod 731 is attached to a slider 732 operably mounted for vertical sliding movement between guides 733—733; 734 is a rack affixed to the face of slider 732; 735 is a pinion mounted on rod 736 which is journaled in bearings 737 which are mounted on the supports 738 which are attached to the tank; 739 is a wheel, chain or otherwise operated, which is attached to shaft 736. By rotation of the wheel 739 the rod 731 may be raised or lowered, raising or lowering the pipe 726 in conformity; 740 is a conical bottom to the tank; 741 is a valve in pipes 742 which connects the sludge tank with the still 8; 743 are supports for the tank.

The operation of the apparatus which has just been described is as follows: The sludge from the sources of sludge supply is brought through the sight feed glass 710 and pipe 713 into the tank where the sludge settles to the bottom, the heavy liquid forms a layer on top of the sludge, and water is separated out on top of the heavy liquid. The condition of the ingredients is such that in many cases so clear a separation is obtained that it is possible to draw off part of the liquid by decantation, substantially clear liquid passing over the weir and out through the pipe 717 from whence it may be returned to the settling tank, to the main settling tank, or may be discharged. Between the layer of sludge at the bottom and the layer of light liquid at the top there may form a layer of the heavy parting liquid of sufficient purity to be withdrawn for storage or immediate reuse. The separation of this intermediate layer is accomplished by the movable pipe 726, which is adjusted up or down by viewing the tank through the sight glass 722. As the layer of intermediate liquid becomes thinner the orifice in pipe 726 is adjusted so that none of the layers on either side of the liquid is taken. In this way the intermediate layer may be drawn off without disturbing the adjacent layers. After the intermediate layer has been drawn off, or before, clear liquid toward the top of the tank may be withdrawn to any desirable height through the openings 719 and the header 720. By observation through the sight glass 722 the operator selects the valve to whose level he wishes to reduce the liquid in the tank, opens that valve, and the liquid drains by gravity or by the use of a pump into pipe 721, and is carried off for reuse in the headers, to the settling tank, or elsewhere. When the relatively clear liquids have been withdrawn from the tank, the valve 741 is opened and the remaining material is forced into the still 8, with the aid of water jets 754. When the sludge trap has been cleared, the valve 741 is closed and the sludge trap is refilled.

In Figures 7 and 7c, 8 refers to a steam still as a whole; 81—82 are outer and inner walls of the still, respectively, braced at points by members 83 which may encircle the still but are preferably open in parts to permit the drainage of water from the upper to the lower portion of the jacket; 84 is a steam jacket at the base of the still; 85 are openings through which steam may be injected directly into the still chamber; 86—86 are points for the admission of steam and 87—87 are points for the removal of steam and condensed water; 88 is an opening at the top of the still which connects through pipe 89 with the condensers which are to be hereinafter described; 810 is a discharge pipe at the bottom of the still; 811 is a valve in the said pipe; 812 is an opening in the top of the still; 813 is a removable closure therefor, held in hermetical contact therewith by bolts 814 or by other suitable means; and 815 are supports for the still; 820 is a water line; 821 are pipes leading from the water line to the base of the still to furnish means for making fluid the solid residue from the distillation and for ejecting said residue through pipe 810; 822 is a vent line passing through the top of the still; 823 is a valve in the vent line 822; 750 is a vent line communicating with the interior of the sludge trap through the top thereof; 751 is a valve in the vent line 750. Vent line 822 connects with vent 750. 752 is a vent pipe to which both 822 and 750 are attached. This vent 752, together with all the other vent pipes in the apparatus are directed to a scrubbing system such as a spray of water which removes entrained vapors therefrom. The scrubbing system being of standard construction is not shown, and the vents in general are shown for convenience as open at the upper end. 753 is a water supply line encircling the base of the sludge trap; 754 are blow-out lines penetrating the shell of the sludge trap at the base thereof so that the heavy residue from the sludge trap may be forced through the valve 741 into the still.

The operation of the still is as follows: A charge having been dropped through the pipe 742 into the still, steam is admitted through the openings 86 to the jacket and directly to the charge through the openings 85. Preheating before admission of the steam to the charge is sometimes advantageous. The heavy liquid and water contained in the still are vaporized at a temperature below that of decomposition of the liquid and pass off together with the steam through opening 88 and pipe 89, which directs them to the condensers. When the last of the heavy liquid has been recovered, the valve 811 is opened and water pressure from source 820 carries the waste contents of the still through the pipe 810 to its destination. Steam pressure can also be used to aid ejection of the sludge.

Figures 9 and 9a show the condenser system. Two standard sections of radiator each containing four units constitute, we have discovered, an excellent condenser when used in combination with a single fishtail spray for each unit. In the drawings 910 are the four units of one standard radiator section and 911 are the four units of a second standard radiator section. 912 is a water supply pipe; 913 is a valve therein; 914 are four pipes extending above the radiator sections; 915 are single sprays above the units of the radiator sections.

The apparatus functions as follows: Through pipe 89 is carried the distillate from the still which finds its way through the radiators in the direction of the arrows. Each radiator section is sprayed with cold water and the distillate is condensed and is directed through pipe 891 to the cooler 95.

In Figure 10 is shown a type of joint used throughout the apparatus. It will be appreciated by engineers that the majority of pipes in this system carry suspensoidal matter in addition to liquid and that the suspensoidal matter will tend to precipitate out wherever a joint is found. In order to make possible the cleaning of all such joints, they are constructed as follows: $t$ is a pipe line; $m$ is a pipe joint or elbow; $n$ is a pipe line; $o$ is a pipe screw threaded at $o$—$o$ and covered by a removable cap $q$. When joint $m$ tends to collect too large a deposit, the cap $q$ is removed and a hose bearing water under pressure is attached to the screw thread $o$—$o$. When the water is turned on it blows any collected silt or deposit away from the joint. The hose is removed and the cap $q$ is replaced. By directing the flow of liquid from pipe $n$ through pipe $t$ the silt piles up in the pipe $o$ until it is substantially full. Thereafter the errosive effect of water is borne by the collected silt, not by the piping.

In Figures 8, 8a, and 8b is illustrated an apparatus for determining the percentage of coal in the sinks and the percentage of slate in the floats, in other words, for determining the ash content of the clean coal as delivered by the system so that the middlings may be divided to the best advantage. In these figures 75 indicates generally a long trough, made preferably of some chemically resistant metal; 750—750 are walls which divide the trough into a series of chambers; 751—751 are trays having foraminous bottoms 752 and preferably solid sides, the shape of the trays conforming substantially to the shape of the compartments of the trough. Each compartment of the trough is provided with a tray. The trays are pivoted at one end to the trough, conveniently by a method shown in Figure 8c. 753 are U-shaped members attached by welding or otherwise to the outer edge of the tray 751; 754 is a pipe or other circular member attached to or forming the edge of the trough 75; 755 are bolts passing through the ends of U-shaped members 753; 756 are handles attached to the lip of the tray 751 opposite to the pivot; 757 are stops so placed that they contact the edge of the said trays and prevent their making contact with the bottom of the trough 75; 758 are pipes and valves leading to each compartment for drainage purposes; 759 are stop bars placed approximately midway of and running the length of the sides of the trays; 760 is a scoop having a foraminous bottom 761 and a handle 762; 763 are means for supporting the trough; 764 is a shelf running lengthwise of and before the trough and having an edge 765 to prevent the escape of liquid and a drainage channel 766 and pipe 767 for such liquid; 768 is a screen to prevent the escape of solids down the drain. 770 is a means, such as a steam line, to regulate the temperature of the bath.

In normal operation the apparatus will have possibly ten compartments. Each compartment will be filled to equal depth with a liquid. 769 shows a liquid level. For example, the first compartment will contain a liquid of specific gravity 1.9; the next will have a specific gravity of 1.85; the next 1.8; the next 1.78; the next 1.76, etc., the specific gravities being chosen to give the maximum information with the particular coal or other mineral being treated in the process at the moment. A sample is taken, for instance, of the coal which is discharged from the water-sealed conveyor and a weighed portion thereof is put into the first compartment. Assuming that the specific gravity of the compartment has been correctly chosen for the first test, a considerable portion of the charge will sink and the remainder will float. The operator then takes scoop 760, inserts its nose within the tray, as shown in Figure 8a, slides it across the runners which are at equal depth in each compartment and withdraws the floats. The liquid is allowed to drain back through holes 761 in the foraminous bottom of the scoop and the floats are placed in the next tank, whose specific gravity is somewhat lower. This procedure is continued until the sample has been divided according to specific gravities. By pulling on the handle 756 the trays 751 may be pivoted about pipes 754, draining through holes 752 back into the trough 75 and the sunken material may be dumped into a pan or other suitable means placed on the table 764.

The system is first calibrated by making ash determinations with the particular type of coal which is being separated, a determination being first made of the specific gravity of the incoming matter to determine the specific gravity of the parting liquid to be used in the tank 3. After operation has commenced, samples are taken of both the sinks and the floats and ash determinations are run to calibrate the system. Thereafter determination of specific gravities is made by plotting subsequent tests against the control. In this way the coal content of the slate and the slate content of the coal may be determined and from the information obtained adjustment made to vary the percentage of slate in the coal as hereinbefore described. In each instance there will be given an accurate check on the distribution of middlings since it will be understood that, if the specific gravities range between that in which pure coal alone will float and that in which slate alone will sink, the specific gravities of the samples which sink in succeeding baths will be in direct relation to their respective quantities of coal and stone. Zinc chloride solution is a satisfactory agent for use in this apparatus because it can be easily diluted to precise specific gravities, but any other satisfactory liquid may be used. Having determined the distribution of the middlings as actually distributed by the apparatus, a prompt change can be made in the setting of the apparatus so that another and more favorable distribution can be made if such is desired.

On the key figure a piping diagram is shown in which, for convenience sake, certain of the valves have been indicated by the numbers V1, V2, etc. Referring to that diagram, the parting section is filled with liquid by opening valve V14 and by means of a pump P2 and pipe line force the parting liquid into the chamber 353 and the tank 3 until the level of weir 357 is reached. Thereafter the level of the liquid is maintained by overflow through the weir 357, valve V8, and pipe 358 to the used liquid tank. The flow can be kept constant or additions of fluid can be made from time to time by the use of valves V8 and V14. Once the liquid has attained its level valve V14 may be closed, shutting off the supply of parting liquid and valve V8 either closed or left open as is. If at any time it is desirable to drain the tank 3, valves V8, V5, and V14 will be closed, valves V6, V7, and V20 opened and the tank drained directly to the storage tank 964. If sludge is to be removed from the bottom of the tank, drainage will be through valves V6, V5, V4 and pump P2 into sludge tank 7.

If it is desired to remove the sludge from the bottom of section 4, the valve V3 will be opened, valves V2 and V4 will be closed and the sludge will be pumped directly to tank 7. If it is desired to take the sludge from tank 6, valves 623 and V2 will be opened, valves V3 and V4 closed and the sludge will be pumped to the tank 7. The liquid from separator 96 will be run to either the new liquid storage or the used liquid storage by the proper manipulation of valves V13 and V12.

The apparatus which has been described offers an excellent method of accomplishing the process. It is not, however, the only apparatus which can be used to accomplish the process and considerable modification both in general and in detail can be evolved. For example, the process step 1 could be replaced by a thorough wetting from showers containing a film stabilized solution while the coal is passing over the screen. The screen could be of any length which is necessary to secure a thorough wetting of the coal with the active agent solution.

The second step in the process, which involves washing of the coal can be omitted, but would entail the loss of all the film stabilizer, which would tend to increase the cost of the process. Consequently, although it is theoretically possible to omit the second step, it will not be omitted in the preferred form of the invention.

In the parting step of the process the liquid used is preferably organic and of the halogenated hydrocarbon type. However, the parting step of the process is not limited to such agents, since any separating agent which has effective specific gravity and is inert, to the materials which are to be separated, may be used. The factors which are desirable are that the material shall have high boiling point in order that there shall be low vapor pressure at working temperatures, low melting point in order that the material may be liquid at working temperatures and the expense of keeping the compound fluid by heat avoided, low solubility in water in order that the parting liquid may not become contaminated with the sealing liquid, and may not be carried out on the separated material, stability under the conditions of operation including stability to agents, air, light, and heat, low hydrolyzing capacity, low toxicity in order to avoid injury to operators when the apparatus is cleaned, low viscosity, and low cost. The relation of film stabilizers to water-insoluble organic liquids has already been discussed.

Among the compounds which we have found useful, and which are exemplary of the preferred class of parting liquids are the following: pentachloropropane, 3,4 dibromo 2,2 dimethyl butane, iodobutane, hexachloropropane, 1 chloro 3 bromopropane, 1 bromo 2,3 dichloro n butane, 1 iodobutane, 1 chloro 1 bromoethane, 1,3 dibromo 2,2 dimethyl propane, 2,4 dibromopentane, pentachloroethane, 2,3 dibromopentane, 1,2 dibromo 2 methyl butane, 1 chloro 2 bromoethane, 2 iodopropane, 1,5 dibromopentane, 1,4 dibromopentane, heptachloropropane, 1,2 dibromopentane, 1 iodoheptane, 2-chloro 1 iodobutane, 1,1 chloro 1 bromoethane, 1,1 dibromo 2,2 methyl propane, 1,4,7 tribromoheptane, 1,1,1 trichloro 2 bromopropane, 2,2, dibromopropane, 1,2 dibromo 2 methyl propane, 1,3 dibromobutane, 1,4 dibromobutane, 1,2 dibromobutane, 1,3 dibromo 2 methyl propane, 2,3 dibromobutane, 2,2,2 trichloro 1 bromoethane, 2 chloro 1 iodopropane, 3 chloro 1 iodopropane, 3 chloro 1,2 dibromobutane, iodoethane, 2 fluoro 1,1,2,2 tetrabromoethane, dichlorobromomethane, 1,2 dibromopropane, 1 chloro 2,3 dibromobutane, 1,3 dibromopropane, chlorobromomethane, tribromo 2 methyl pentane, 3 chloro 1,2 dibromopropane, dichloriodopropane, 1,6 diiodohexane, trichlorobromomethane, 1 chloro 1 iodoethane, 2 chloro 1,2 bromopropane, 1,3 dichloro 1,2 dibromopropane, fluoro 1,2 dibromopropane, 1,1 dibromoethane, 2,3 dichloro 1,2 dibromopropane, 2 fluoro 1,1 dichloro 1,2 dibromoethane, 1 chloro 1,1 dibromoethane, 2 chloro 1 diodoethane, 1,2,2 tribromobutane, 1,2,3 tribromobutane, 1,1,2 bromobutane, 1,2 dibromoethane, 1,5 diiodopentane, 2 bromo 2 iodopropane, 2,2 dichloro 1 iodoethane, 1,2,3, tribromobutane, 2,2 difluoro 1 iodoethane, 1,1 difluoro 1,2 dibromoethane, 1,1,2 trifluoro 1,2 dibromoethane, 1 fluoro 1,2 dibromoethane, 2 chloro 1,2 dibromoethane, methyl iodide, 1,1 dichlor 1,2 dibromoethane, 1,2 dichloro 1,2 dibromoethane, 2,2,2 trichloro 1,1 dibromoethane, 1,3 iodobutane, 1,4 iodobutane, 2,2 difluoro 1,1 dibromoethane, 1,2,2 tribromopropane, 1,4,7 triiodoheptane, 1,1,2 tribromopropane, trichloro iodomethane, 2,2 dichloro 1,1 dibromoethane, 3 chloro 1,2,2 tribromopropane, dibromo dichloromethane, 1,2,3 tribromopropane, 1,2,2 trichloro 1,1,2 tribromoethane, dibromo chloromethane, 2,2 diiodo propane, chloro diodomethane, dichloro iodomethane, dichloro tribromobutane, 1,2 diiodopropane, 1 bromo 1 iodoethane, 2 bromo 1 iodoethane, 1,1,4,4 tetrabromobutane, methylene bromide, 1,1,2,3, tetrabrom 2 methyl propane, 1,1,2 trifluoro 1,2,2 tribromoethane, 1,3 diiodopropane, 1,1,2 tribromoethane, 1 chloro 1,1,2 tribromoethane, 1,1 difluoro 1,1,2 tribromoethane, 1,1,2 tribromoethane, 1,2 dichloro 1,1,2 tribromoethane, 1,2,2,3 tetrabromopropane, 2 fluoro 1,1,2 tribromoethane, 1,4 dichloro 1,2,3,4 tetrabromobutane, 1,1,2,3, tetrabromopropane, 1,1 diiodoethane, bromoform, hexabromobutane, 1,1,1,2 tetrabromoethane, iodobromomethane, 1,1,2,2 tetrabromopropane, 1,1,2,2 tetrabromoethane, 1,1,2,2,3 pentabromopropane, diiodo chloromethane, pentabromoethane, methylene iodide, 1 chloro 1,1,2,2 tetrabromoethane, perchlorethylene, 2,3 dibromopentene-2,1,1,2,3,3,3 hexachloropropene-1, 2-iodopropene-1, 2 chloro 1 bromoethene, 3-iodopropene-1, 1,3 dibromo 2 methylpropene-1, 1,2 dichloro-1 bromoethene, 1,2 dibromobutene-1, 2,2 dichloro 1 bromoethene, 2-chloro 3-iodopropene-1, 1 chloro 3 iodopropene-1, 1,2 dibromopropane-1, 3 iodopropine-1, 1,1,2 chloro 1 bromoethene, 1 iodopropine-1, 1,3 dibromopropene-1, 1,3 dibromopropine-1, 2 chloro 1 iodoethene, 1 chloro 1,2 dibromoethene, 1,2 dibromoethene, 2 fluoro 1,1 dibromoethene, 1,2 difluoro 1,2 dibromoethene, 1,2 dichloro 1,2 dibromoethene, 1,2,3 tribromopropene-1, 1,2 diiodopropene-1, 2 bromo 1 iodoethene, fluoro tribromoethylene, tribromoethylene, 2,2 dibromo 1 iodoethene, 1,2 iodoethene, iodocyclohexane, 1,2 dibromocyclohexane, 3,4 dibromo 1,2 dimethylbenzene, 3,4 dibromotoluene, 2,6 dibromotoluene, 2,5 dibromotoluene, iodobenzene, 1 iodo 2 chlorobenzene, 1,3 dibromobenzene, 1,2 dibromobenzene, trichlorethylene, 4 chlorethane and carbon tetrachloride.

The list has been mainly directed to halogenated hydrocarbons but it is to be understood that any liquid having the desirable qualities set forth above can be used so far as the mere separating step is concerned.

Kerosene, benzene and naphthalene and other hydrocarbons, and other organic liquids essentially insoluble in water and miscible with the preferred parting liquids, particularly those of low boiling point and vapor pressure can be used as diluents to alter the specific gravity of parting liquids. When their gravity is sufficient such essentially water-insoluble organic liquids may be used as parting liquids apart from the preferred class. If film stabilizers are used therewith they must bear the relation thereto that has been hereinbefore set forth.

The specific gravity of the parting liquid used will be between the specific gravities of the mineral and gangue which are to be separated. The separating liquid within the tank will be covered by a sheet of water or other liquid inert thereto which will serve the purpose of preventing evaporation of the liquid and of rejecting parting liquid which gathers on the floating material. The liquids may be so arranged as to fill the whole tank or to fill only a portion of the tank.

It is advisable to design the chamber in which the separating actually occurs with particular reference to the mineral which is to be treated. For example, if a finely divided iron is to be separated from its gangue, a longer chamber would be required in order to give all the fine particles an opportunity to respond to the parting action of the liquid. On the other hand, in those cases where no rafting of the particles is observable and separation is quickly and completedy carried out, a short chamber may be used. Another method of accomplishing this variation is to vary the speed at which the liquid within the separating chamber travels, thereby varying the length of time which the material is allowed to separate.

The parting liquid can be of one liquid or it can be a mixture of completely miscible liquids of different specfic gravities. Thus a mixture of $C_2H_2BR_4$ and $C_2H_2Cl_4$ will give a range of specific gravities from 2.95 to 1.59. This principle can be availed of to adjust the specific gravity of the liquid to one in which the middlings will sink at a rate most favorable for separation by the apparatus. This selection of specific gravity may be availed of to secure particular separation of the middlings in a machine provided with an immovable wedge.

The velocity with which the conveyors travel in this apparatus determines the point to which the middlings will have sunk at the moment they contact the wedge. Thus, by speeding up or slowing down the conveyors the velocity of the liquid can be increased and a variation in the slate containing middlings included with the coal accomplished. By speeding up the conveyors the liquid will travel faster, the middlings will not have sunk so far and a wider percentage of low-coal middlings be incorporated with the coal. By slowing down the conveyors the parting liquid will travel more slowly and only the richer coal middlings be incorporated with the coal.

A third method of varying the slate content of the coal and the coal content of the slate is by adjusting the point of the wedge up or down. Means for doing this have been described in the specification.

These three methods of dividing the middlings may be used separately, with one another, or all together and when so used give the very greatest flexibility to the system.

In Figures 3k and 3l are shown a modified means of adjusting the wedge. Alongside the main tank 3 are boxes 390. Slots 391 connect the said boxes to the main tank. 392—393 are links pivotally attached to the lower edge of the wedge; 393—393 are pins connecting the links 392 with blocks 394 sliding in the boxes 390; 395 are internally screw threaded arms on the blocks 394; 396 are screw threaded pins threaded into blocks 395 and rotatable by pinions 397 affixed to the ends thereof; 398 is a rod penetrating tank 3 and having pinions meshing with pinions 397 in boxes 390; 399 is a hand-wheel for turning the rod 398 to operate the pinions and move the blocks and links in one direction or the other whereby to adjust the wedge. A stuffing box prevents leakage of the fluid around the shaft.

This description has been more or less specifically directed to the separation of coal from its indigenous impurities. The process is not limited to coal, however, and it is applicable to the separation of minerals in general, although it can be readily understood, as elsewhere herein pointed out, that to secure the best results with a particular mineral the speed of the liquid medium, the density of the parting liquid, and the lengh of the separating chamber may be varied. Substantially all minerals are obtained in their native condition in admixture with indigenous impurities. In some cases the mineral is the heavier and the gangue the lighter. In such case the gangue will float on the surface of the parting liquid and the mineral will sink to the bottom and be carried out by the lower conveyors. In other cases, as in the case of coal, the reverse is true. The design of the conveyor system may advantageously be altered to accommodate the amounts of mineral and gangue which are to be expected with a particular process. Another variation which must be considered by the engineer in treating different minerals is that the specific gravities of the minerals themselves vary. Thus, anglesite varies from 6.1 to 6.4; anthracite coal varies from 1.3 to 1.7 and bituminous coal varies from 1.1 to 1.5. Among the minerals which can be separated from their gangues by this process are the following: asbestos, bituminous coal, anthracite coal, chrysocolla, garnerite, quartz, feldspar, black diamond, mica, fluorite, wad, siderite, calamine, rhodochrosite, diamond (gem grade), cyanite, limonite, azurite, psilomelane, malachite, garnet, corundum, sphalerite, willemite, chalcopyrite, smithsonite, witherite, rutile, stannite, chromite, barite, tetrahedrite, ilmenite, energite, pyrrhotite, covellite, pentlandite, molybdenite, braunite, pyrolusite, bornite, hematite, pyrite, magnetite, franklinite, millerite, zincite, chalcocite, cuprite, scheelite, anglesite, vanadate (lead), cerussite, heubnerite, cassiterite, wolframite, galena, iron, niccolite, ferberite, cinnabar, copper (native), silver, platinum, and gold.

Not all of these minerals require treatment with a film stabilizer because in some cases the mineral is quickly wetted by water and holds the water in sufficiently close bondage to prevent substantial displacement thereof by the parting liquid. In such cases the use of a film stabilizer is unnecessary. On the other hand, the minerals which are not quickly wetted by water, or from which when wet by water the water is substantially displaced by the parting liquid, are organophyllic and should be given a preliminary treatment with an aqueous solution of a film stabilizer.

Many modifications of the scrubbing process are possible. In addition to the sprays herein shown, sprays may be directed from beneath the screen to assist in the scrubbing of the coal. The concentrating table or riffle board can be omitted, but its omission is inadvisable if preferred results are to be obtained. It has been stated in the literature that no static means has been designed which is capable of separating coal size from wash water. It is believed that the method of separation which is disclosed represents the first successful separation of coal size and solids by a semi-static process. In this separation the riffle plate plays a valuable part by tending to precipitate the fines, coagulate the minute globules of parting liquid, and separate the water. This, in combination with the three weir-type settling tanks, makes a system of great efficiency from which the recovery of heavy liquid is almost quantitative. The weir can be omitted from the so-called sludge trap and the water which collects in the upper layer drained off solely through the collective draining valves on the side thereof. The efficiency of the first two tanks is such that it is sometimes possible to omit the sludge trap and direct the sludge from the first two tanks directly to the still for steam distillation.

Any satisfactory method of distilling may be used to remove the heavy liquid from the sludge. The one illustrated is shown because it produces excellent results.

The condenser of radiator type is an installation the cost of which is about one-tenth that of a standard condenser system of the type capable of handling an equal quantity of condensate, and which saves enormous quantities of water.

The cooler whose function is to reduce the temperature of the condensate is of standard design and construction. It is shown diagrammatically as a sleeve about the pipe which connects the condenser 9 with the water separator 96, the sleeve being closed at its ends and provided with an inlet toward one end and an outlet toward the other end for a stream of cooling liquid.

In the water separator the parting liquid and water, being immiscible and of different specific gravities, separate out. The parting liquid is run to the storage tanks and the water is preferably returned to another section, for instance, the main settling tank.

The storage system shown, wherein a new liquid tank overlies a used liquid tank, is a convenient one but not essential to the process. Other systems of storage could be used. Most such systems, however, would involve the principle of adding fresh liquid to the used liquid as needed. The addition of new to used liquid may take place in the separating tank, in the storage tank, or elsewhere as the engineer sees fit.

In actual operation the system is in almost perfect balance. Substantially all the water used is recovered and returned to the system, substantially all the parting liquid used is returned to the system, and substantially all film stabilizer is usefully employed. It may be stated with complete accuracy that the system requires a minimum of attention, and a minimum of operating fluids and yields results which are equal to or better than those which have heretofore been considered theoretically possible. For example, in Taggart "Handbook of Ore Dressing" the statement is made that the standard use in the laboratory for determining that degree of separation which utilizes the last useful quantities of coal and eliminates the last useless quantities of slate is the sink and float method as performed in a beaker. Taggart also states that that perfection of separation is impossible of attainment. By virtue of the development of this process and apparatus, however, the perfection of separation which Taggart mentions as attainable in a beaker is accomplished on a commercial scale.

An advantage of this invention as a whole is that there has been produced a coal cleaning process based on the use of a parting liquid which is capable of competing with the highly developed processes previously used in the art. Another advantage of the invention is that, by the processes set forth, the losses of expensive separating liquid are reduced to a point that makes the process commercially feasible and actually makes it considerably less expensive than the older processes. Another advantage of the invention is the rapidity with which the process can be operated with satisfactory results. A unit having only four square feet of separating surface was tested for speed and satisfactorily separated 140 tons per hour, its capacity being then limited by the capacity of the conveyors which were working at utmost capacity and could not handle a higher rate. The ultimate capacity of the system is at present unknown. With normal comparatively leisurely speeds of operation its capacity is about ten times that of previous systems having equal separating surface areas.

Coal may be prepared by this process with any degree of ash content the operator desires. Heretofore systems of coal cleaning had made a rough division between coal and slate but the percentage of coal in the slate and the percentage of slate in the coal varied from minute to minute. The idea of producing coal of standard ash content was a desideratum without a satisfactory means of obtaining it. 85% efficiency has been considered good for coal cleaning processes and many of the mountainous waste banks found in the coal regions contain 15% to 35% of usable fuel. By our invention these waste piles may be profitably reclaimed.

In its generic sense, the invention presents a method of immunizing the surface of a carbonaceous solid against the adhesion of an organic liquid, which has seemingly not before been done. In this sense, the invention is applicable to a great variety of uses and in fields far removed from mining. All such uses are in the scope of the invention.

As many apparently widely different embodiments of this invention may be made without departing from the spirit and scope thereof, it is to be understood that we do not limit ourselves to the specific embodiments thereof except as defined in the appended claims.

This case includes a complete description of an operative process to accomplish the intended result. However, there are various parts of apparatus which, because of questions of inventorship, questions of subject matter, or questions of claims and classifications, are either necessarily or optionally divisible. Such matters have been claimed in separate applications disclosing the particular subject matter and the relation of cases and their subject matter is roughly as follows: This case relates to a complete, operative process involving the use of the new film stabilizers, the film stabilizers themselves, and the product which is produced by the process. Certain subsidiary inventions are also claimed herein. The application of Alexander et al., Serial No. 98,819, is directed to the complete process apart from the treatment with film stabilized water, to the liquid recovery system, and to certain subsidiary inventions. It is divisible from this case because it could be used in processes not involving film stabilization. The application of Foulke et al., Serial No. 98,821, is directed to the inventive features inherent in the separating chamber itself, together with the product of the separating chamber, being coal with a uniform ash content, and to some subsidiary inventions. In the application of Alexander et al., Serial No. 98,820 is described the washing apparatus and certain subsidiary inventions.

This case is a continuation-in-part of application Serial No. 177,190, filed November 30, 1937.

We claim:

1. The process which comprises washing a discontinuous coal-containing mass in an aqueous bath containing water and a film stabilizer; removing floating materials from the surface of the solution; withdrawing the mass from the solution and washing it with water; removing sediment from the used washing fluid; adjusting the percentage of film stabilizer in the said washing fluid to a percent useful as an initial immersing bath; immersing the treated coal in a water-covered, essentially water-insoluble halogenated hydrocarbon parting liquid; removing the mass from the separating bath; scrubbing the mass with water; and separating the parting liquid from the scrubbing water for reuse in the separating chamber; the said process being performed substantially out of contact with the air.

2. The process which comprises washing a broken coal-containing mass with an aqueous bath containing a film stabilizer; removing the mass from the said solution and washing it with water; removing solids from the wash water which contains film stabilizer solution; fortifying the said wash water with film stabilizer for use in the said first-named aqueous bath; immersing the mass in an essentially water-insoluble parting liquid comprising a halogenated hydrocarbon; removing the mass from the parting liquid; draining it; collecting the liquid that drains from the mass; scrubbing the mass substantially free from adhering liquid by means of water; separating the solids from the liquid drainings and scrubbings; returning the so-separated liquid to the separating step; and removing residues of liquid from the separated solids by steam distillation.

3. The process which comprises washing a broken coal-containing mass with an aqueous bath containing a film stabilizer, washing the coal-containing mass with water, immersing it in a parting medium comprising an essentially water-insoluble organic parting liquid, removing the mass from the liquid, and removing adhering liquid from the mass, said operations being performed substantially out of contact with the air.

4. The process which comprises wetting coal with an aqueous bath containing a film stabilizer, separating the coal from accompanying impurities by immersion in a liquid comprising a halogenated hydrocarbon of density intermediate that of the coal and the impurities, scrubbing the coal with water, separating the used scrubbing liquid containing light suspensoidal matter from precipitated matter, separating the said light suspensoidal matter from the liquid, combining the so-separated suspensoidal and precipitated matters, separating liquid therefrom by settling and decantation, and distilling the solids left by said decantation.

5. The process which comprises wetting coal with an aqueous bath containing a film stabilizer, separating the coal from accompanying impurities by immersion in a liquid comprising a halogenated hydrocarbon of density intermediate that of the coal and impurities, scrubbing a separated portion with water, collecting the scrubbing liquid and separating it from the bulk of associated solids by a treatment involving thickening by settling, removing the parting liquid from the said associated solids, and returning it to the scrubbing step for reuse.

6. The process which comprises washing a coal-containing mass with an aqueous bath containing a film stabilizer, separating the coal from the impurities by immersion in a liquid comprising a halogenated hydrocarbon of density between that of the coal and the impurities, scrubbing the coal with a liquid essentially insoluble in the parting liquid, separating solids and parting liquid from the scrubbing liquid, and returning the said scrubbing liquid to the washing step for reuse.

7. In the process of separating coal from impurities which involves a liquid comprising a halogenated hydrocarbon of density intermediate that of coal and that of the impurities, the preliminary steps which comprise washing the coal with an aqueous bath containing a film stabilizer, and washing it with water.

8. The process which comprises washing a coal-containing mass with an aqueous bath containing a film stabilizer, separating the coal from ingredients of the mass having different density by immersion in a liquid comprising a halogenated hydrocarbon of intermediate density, washing the separated constituents, removing solids from the said washing liquid, steam distilling the solids, condensing the distillate, and separating water therefrom.

9. The process which comprises washing a coal containing mass with an aqueous bath containing a film stabilizer, immersing the mass in a halogenated hydrocarbon parting liquid, withdrawing the mass therefrom, and washing the mass with water.

10. In the beneficiation of coal the steps which comprise washing the coal-containing mass with an aqueous bath containing a film stabilizer, immersing the said mass in a water-insoluble organic parting liquid, separating the mass and the parting liquid, and removing the adhering parting liquid from the said mass by washing.

11. A process which comprises washing a coal-containing mass with an aqueous bath containing an emulsoid colloid, washing the mass with water, immersing it in an organic parting liquid comprising a halogenated hydrocarbon, separating mass and organic liquid, and washing the mass.

12. A process which comprises washing a coal-containing mass with an aqueous bath containing a glycoside of which the aglucone is an unsymmetrical polyhydroxy aromatic radical, washing the mass with water, immersing it in an organic parting liquid substantially insoluble in water, separating the mass and the parting liquid, and removing the organic liquid which clings to the solid by washing.

13. The process of mineral beneficiation which comprises washing a discontinuous mass of mineral-containing solids with an aqueous bath containing a film stabilizer, washing the so-treated mass with water, immersing it in a parting medium comprising an essentially water insoluble organic parting liquid, removing the solids from the parting liquid, and removing the adhering parting liquid from the said solids, said operations being performed substantially out of contact with the air.

14. The process which comprises washing a mineral- and gangue-containing mass having organophyllic constituents with an aqueous bath containing a film stabilizer, removing excess of the aqueous bath from the said mass, immersing the said mass in a parting medium composed mainly of halogenated hydrocarbons, removing the mass from the separating bath, and washing it with water to remove adhering separating liquid.

15. In the process of separating a mineral-containing mass having organophyllic parts according to density in an essentially water-insoluble parting medium comprising an organic liquid of intermediate density, the step of applying an aqueous bath containing a film stabilizer to the mineral-containing mass prior to its immersion in the separating bath.

16. The process which comprises subjecting a mass of solids having organophyllic constituents to the action of an aqueous, non-solvent bath containing a film stabilizer, putting the mass in an organic parting medium being essentially non-solvent to the said aqueous bath, removing the mass from the parting medium, and washing the mass to remove adhering liquid.

17. The process which comprises washing a mineral-containing mass with an aqueous bath containing a film stabilizer, separating the mineral from ingredients of different density by immersion in a liquid comprising a halogenated hydrocarbon of intermediate density, washing the separated constituents, removing solids from the said washing liquid, and steam distilling the solids.

18. In a process of mineral beneficiation involving separation according to densities in an essentially water-insoluble parting liquid, the steps of washing the mineral with an aqueous bath containing a film stabilizer, washing it with water, collecting the used wash water, separating solids therefrom, fortifying the used wash water with film stabilizer, and treating the incoming mineral therewith.

19. The method of immunizing the surface of an organic essentially water-insoluble substance against adhesion to a substantially water-insoluble organic parting liquid which comprises applying to the surface of the solid an aqueous film containing a film stabilizer.

20. The process of preparing a mineral surface not readily wetted by water which is to be placed in contact with an organic parting liquid essentially insoluble in water, which comprises applying to the surface of said mineral an aqueous bath containing a film stabilizer.

21. A process which comprises washing a mineral which is not readily or preferentially wet by water with a dilute aqueous bath containing an emulsoid colloid, immersing the mineral in an organic parting liquid substantially insoluble in water, separating mineral and organic liquid, and removing the organic liquid adhering to the solid by washing.

22. A process which comprises washing a mineral which is not readily or preferentially wet by water with a dilute aqueous bath containing starch acetate, immersing the mineral in an organic parting liquid substantially insoluble in water, separating mineral and organic liquid, and removing the organic liquid adhering to the solid by washing.

23. A process which comprises washing a mineral which is not readily or preferentially wet by water with a dilute aqueous bath containing a glycoside in which the aglucone is an unsymmetrical polyhydroxy aromatic radical, immersing the mineral in an organic parting liquid substantially insoluble in water, separating mineral and organic liquid, and scrubbing the mineral to remove parting liquid.

24. A process which comprises washing a mineral which is not readily or preferentially wet by water with a dilute aqueous bath containing tannic acid, immersing the mineral in an organic parting liquid substantially insoluble in water, separating mineral and organic liquid, and scrubbing the mineral to remove parting liquid.

HENRY L. ALEXANDER.
HUBERT I. DU PONT.
WILLING B. FOULKE.

CERTIFICATE OF CORRECTION.

Patent No. 2,151,578.   March 21, 1939.

HENRY L. ALEXANDER, ET AL.

It is hereby certified that error appears in the printed specification of the above numbered patent requiring correction as follows: Page 1, second column, line 51, for "obpect" read object; line 55, for "stabilizer" read stabilizers; page 3, first column, line 71, for "slit" read silt; page 5, first column, line 25, for "plenolic" read phenolic; page 9, second column, line 29, for "revoluble" read revolvable; page 16, second column, line 26, for "diodomethane" read iodomethane; page 17, first column, line 69, for "392-293" read 392-392; and that the said Letters Patent should be read with this correction therein that the same may conform to the record of the case in the Patent Office.

Signed and sealed this 27th day of June, A. D. 1939.

(Seal)

Henry Van Arsdale
Acting Commissioner of Patents.

the said mass in a parting medium composed mainly of halogenated hydrocarbons, removing the mass from the separating bath, and washing it with water to remove adhering separating liquid.

15. In the process of separating a mineral-containing mass having organophyllic parts according to density in an essentially water-insoluble parting medium comprising an organic liquid of intermediate density, the step of applying an aqueous bath containing a film stabilizer to the mineral-containing mass prior to its immersion in the separating bath.

16. The process which comprises subjecting a mass of solids having organophyllic constituents to the action of an aqueous, non-solvent bath containing a film stabilizer, putting the mass in an organic parting medium being essentially non-solvent to the said aqueous bath, removing the mass from the parting medium, and washing the mass to remove adhering liquid.

17. The process which comprises washing a mineral-containing mass with an aqueous bath containing a film stabilizer, separating the mineral from ingredients of different density by immersion in a liquid comprising a halogenated hydrocarbon of intermediate density, washing the separated constituents, removing solids from the said washing liquid, and steam distilling the solids.

18. In a process of mineral beneficiation involving separation according to densities in an essentially water-insoluble parting liquid, the steps of washing the mineral with an aqueous bath containing a film stabilizer, washing it with water, collecting the used wash water, separating solids therefrom, fortifying the used wash water with film stabilizer, and treating the incoming mineral therewith.

19. The method of immunizing the surface of an organic essentially water-insoluble substance against adhesion to a substantially water-insoluble organic parting liquid which comprises applying to the surface of the solid an aqueous film containing a film stabilizer.

20. The process of preparing a mineral surface not readily wetted by water which is to be placed in contact with an organic parting liquid essentially insoluble in water, which comprises applying to the surface of said mineral an aqueous bath containing a film stabilizer.

21. A process which comprises washing a mineral which is not readily or preferentially wet by water with a dilute aqueous bath containing an emulsoid colloid, immersing the mineral in an organic parting liquid substantially insoluble in water, separating mineral and organic liquid, and removing the organic liquid adhering to the solid by washing.

22. A process which comprises washing a mineral which is not readily or preferentially wet by water with a dilute aqueous bath containing starch acetate, immersing the mineral in an organic parting liquid substantially insoluble in water, separating mineral and organic liquid, and removing the organic liquid adhering to the solid by washing.

23. A process which comprises washing a mineral which is not readily or preferentially wet by water with a dilute aqueous bath containing a glycoside in which the aglucone is an unsymmetrical polyhydroxy aromatic radical, immersing the mineral in an organic parting liquid substantially insoluble in water, separating mineral and organic liquid, and scrubbing the mineral to remove parting liquid.

24. A process which comprises washing a mineral which is not readily or preferentially wet by water with a dilute aqueous bath containing tannic acid, immersing the mineral in an organic parting liquid substantially insoluble in water, separating mineral and organic liquid, and scrubbing the mineral to remove parting liquid.

HENRY L. ALEXANDER.
HUBERT I. DU PONT.
WILLING B. FOULKE.

---

CERTIFICATE OF CORRECTION.

Patent No. 2,151,578.        March 21, 1939.

HENRY L. ALEXANDER, ET AL.

It is hereby certified that error appears in the printed specification of the above numbered patent requiring correction as follows: Page 1, second column, line 51, for "obpect" read object; line 55, for "stabilizer" read stabilizers; page 3, first column, line 71, for "slit" read silt; page 5, first column, line 25, for "plenolic" read phenolic; page 9, second column, line 29, for "revoluble" read revolvable; page 16, second column, line 26, for "diodomethane" read iodomethane; page 17, first column, line 69, for "392-293" read 392-392; and that the said Letters Patent should be read with this correction therein that the same may conform to the record of the case in the Patent Office.

Signed and sealed this 27th day of June, A. D. 1939.

(Seal)             Henry Van Arsdale
               Acting Commissioner of Patents.